United States Patent
Aoki et al.

(10) Patent No.: US 11,541,891 B2
(45) Date of Patent: Jan. 3, 2023

(54) VEHICLE CONTROL METHOD AND VEHICLE CONTROL DEVICE

(71) Applicants: Nissan Motor Co., Ltd., Yokohama (JP); Renault S.A.S., Boulogne-Billancourt (FR)

(72) Inventors: Motonobu Aoki, Kanagawa (JP); Machiko Hiramatsu, Kanagawa (JP); Takayuki Kondoh, Kanagawa (JP); Tsuyoshi Sakuma, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 17/599,280

(22) PCT Filed: Mar. 29, 2019

(86) PCT No.: PCT/IB2019/000395
§ 371 (c)(1),
(2) Date: Sep. 28, 2021

(87) PCT Pub. No.: WO2020/201796
PCT Pub. Date: Oct. 8, 2020

(65) Prior Publication Data
US 2022/0212670 A1 Jul. 7, 2022

(51) Int. Cl.
*B60W 30/18* (2012.01)
*B60W 30/16* (2020.01)

(52) U.S. Cl.
CPC ...... *B60W 30/18163* (2013.01); *B60W 30/16* (2013.01); *B60W 2540/225* (2020.02);
(Continued)

(58) Field of Classification Search
CPC .......... B60W 30/16; B60W 30/18163; B60W 2540/225; B60W 2540/229;
(Continued)

(56) References Cited

U.S. PATENT DOCUMENTS

2016/0068156 A1*  3/2016  Horii ..................... B60W 40/04
                                                              701/28
2017/0369053 A1   12/2017  Nogimori
(Continued)

FOREIGN PATENT DOCUMENTS

CN    107209995 A    9/2017
JP    2014-076689 A  5/2014
(Continued)

*Primary Examiner* — Anshul Sood
(74) *Attorney, Agent, or Firm* — Young Basile Hanlon & MacFarlane, P.C.

(57) ABSTRACT

A vehicle control method executed by a processor capable of making a subject vehicle change a lane includes: acquiring surrounding information of the subject vehicle by a sensor provided in the subject vehicle; determining whether a distractive factor for a driver of another vehicle is present when the subject vehicle enters the front of the other vehicle traveling on the second lane for changing lanes from a first lane to a second lane adjacent to the first lane; setting a lane change time required for the subject vehicle to change lanes longer than when determining none of the distractive factor to be present when determining distractive the factor to be present; and controlling a traveling position of the subject vehicle on the first lane within the lane change time.

11 Claims, 13 Drawing Sheets

(52) U.S. Cl.
CPC ............... *B60W 2540/229* (2020.02); *B60W 2554/4047* (2020.02); *B60W 2554/802* (2020.02); *B60W 2555/20* (2020.02)

(58) Field of Classification Search
CPC ....... B60W 2554/20; B60W 2554/407; B60W 2554/802
See application file for complete search history.

(56) References Cited

U.S. PATENT DOCUMENTS

| | | | | |
|---|---|---|---|---|
| 2018/0144636 | A1* | 5/2018 | Becker | B60W 30/0956 |
| 2019/0382018 | A1* | 12/2019 | Garnault | B60W 60/00272 |
| 2019/0384292 | A1* | 12/2019 | Aragon | B60W 40/09 |
| 2020/0079368 | A1* | 3/2020 | Yamada | G05D 1/0055 |
| 2020/0247412 | A1* | 8/2020 | Wang | H04W 4/46 |
| 2020/0290621 | A1* | 9/2020 | Ji | H04W 4/027 |

FOREIGN PATENT DOCUMENTS

| | | |
|---|---|---|
| JP | 2014-241055 A | 12/2014 |
| JP | 2017-140857 A | 8/2017 |
| JP | 2018-160173 A | 10/2018 |
| JP | 2018-197966 A | 12/2018 |

\* cited by examiner

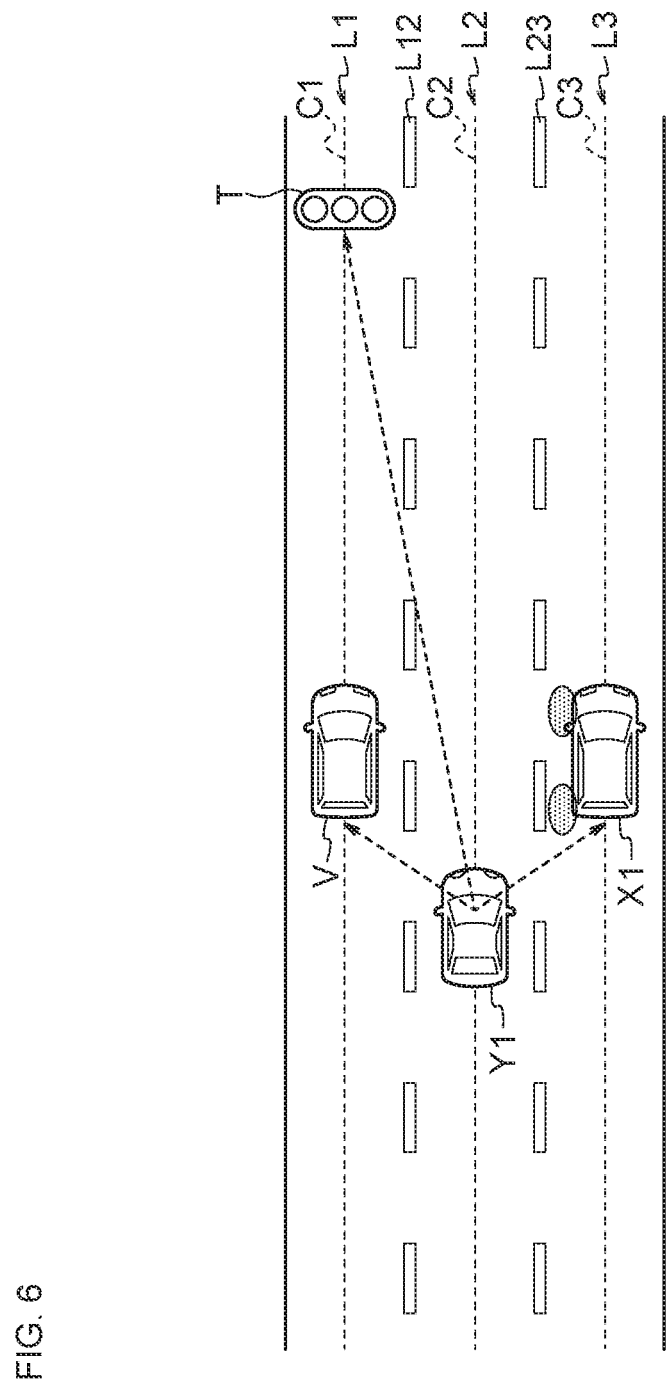

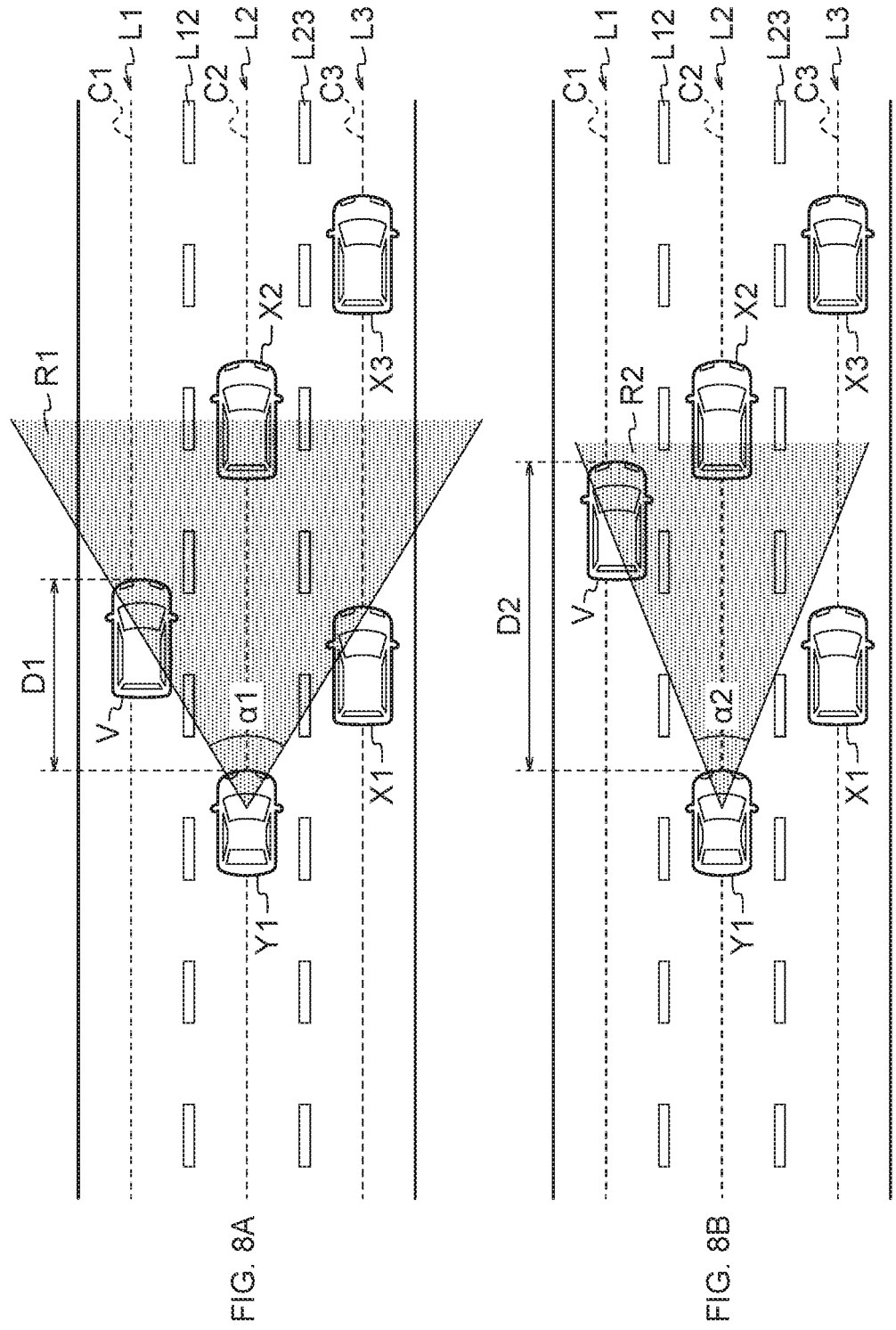

VEHICLE CONTROL METHOD AND VEHICLE CONTROL DEVICE

TECHNICAL FIELD

The present invention relates to a vehicle control method and a vehicle control device.

BACKGROUND

A vehicle control system for changing a lane of a vehicle from a traveling lane to an adjacent lane is known. Such control system sets a lane change time required for the lane change longer as the vehicle speed is smaller when the vehicle speed is smaller than a first predetermined value. Additionally, such control system sets the lane change time longer as the vehicle speed is longer when the vehicle speed is bigger than a second predetermined value (JP2017-140857A).

SUMMARY

When the subject vehicle enters the front of another vehicle to change lanes, the driver of another vehicle confirms the behavior of the subject vehicle before the lane change of the subject vehicle. The conventional vehicle control system, regardless of the state of the driver of another vehicle, takes a time set in accordance with the speed of the subject vehicle to change lanes. Unfortunately, this may shorten the time for the driver of another vehicle to confirm the behavior of the subject vehicle when the driver of another vehicle is not aware of the subject vehicle.

A object to be solved by the present invention is to provide a vehicle control method and a vehicle control device capable of lengthening a time for a driver of another vehicle to confirm the behavior of the subject vehicle in a situation where the subject vehicle enters the front of another vehicle to change lanes.

To solve the above problems, an aspect of the present invention acquires surrounding information of the subject vehicle by a sensor provided in the subject vehicle, determines whether a distractive factor for the driver of another vehicle is present when the subject vehicle enters the front of the other vehicle traveling on the second lane for changing lanes from a first lane to a second lane adjacent to the first lane, sets a lane change time required for the subject vehicle to change lanes, the lane change time being longer when determining the distractive factor to be present than determining the distractive factor not to be present, and controls a traveling position of the subject vehicle on the first lane within the lane change time.

An aspect of the present invention allows to lengthen the time for the driver of another vehicle to confirm the behavior of the subject vehicle in the scene where the subject vehicle enters the front of another vehicle to change lanes.

BRIEF DESCRIPTION OF THE DRAWINGS

FIG. 2B is executed;

FIG. 6 is a diagram for explaining the lane change time calculated by the vehicle control device according to the third embodiment;

FIG. 8 is a diagram for explaining an effective viewing field estimated by the vehicle control device according to the fourth embodiment;

DETAILED DESCRIPTION

First Embodiment

Hereinafter, embodiments of the present invention will be described with reference to the drawings. The present embodiment will be described by exemplifying a vehicle control device mounted on a vehicle.

Figure 1:
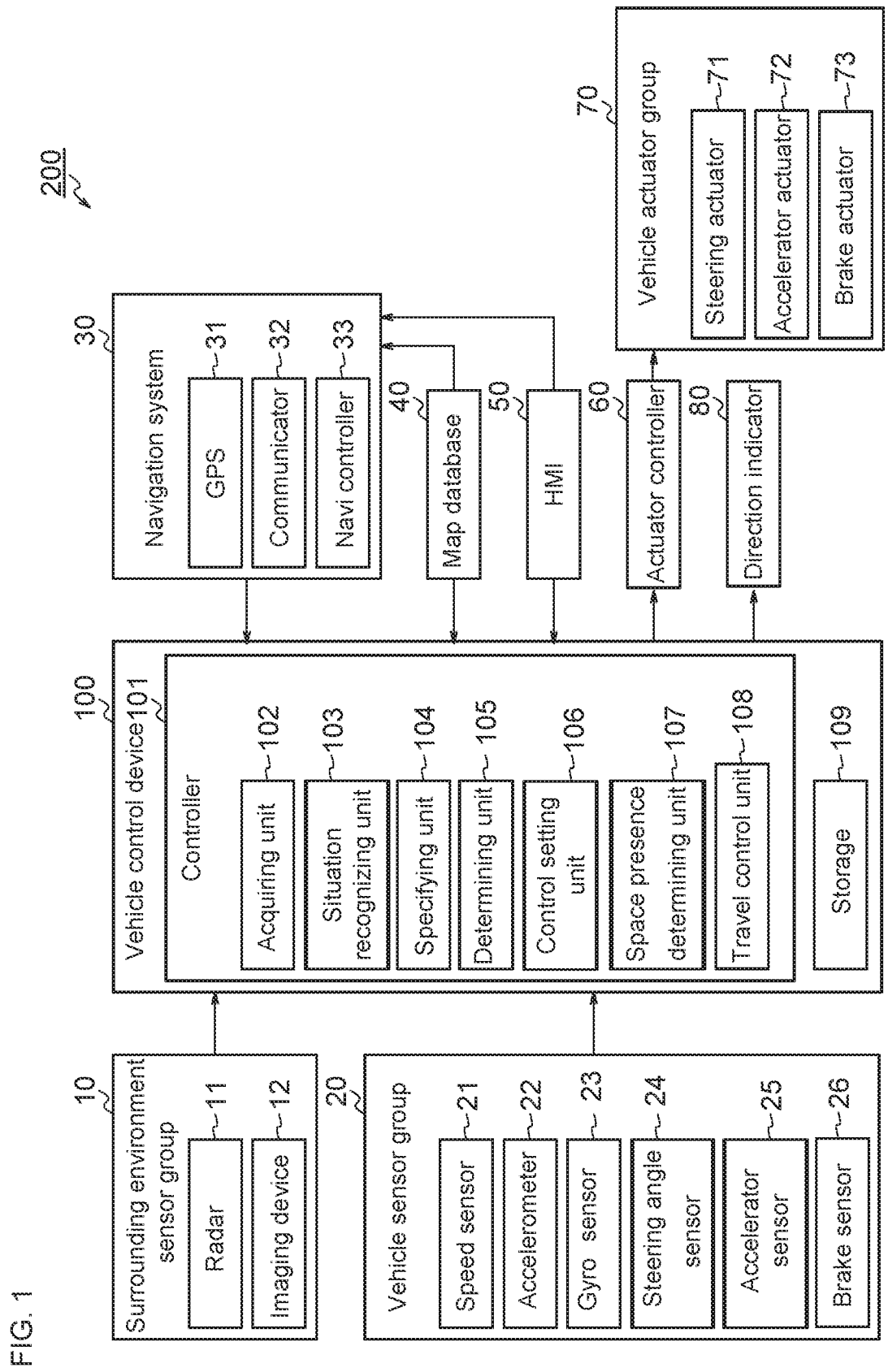
FIG. 1 is a block diagram of an example of a vehicle system including a vehicle control device according to the first embodiment.

FIG. 1 is a configuration diagram of an example of a vehicle system 200 including a vehicle controller 100 according to an embodiment of the present invention. The vehicle system 200 of the present embodiment is mounted on the vehicle. The vehicle system 200 is a system for the vehicle to automatically change the lane.

As shown in FIG. 1, the vehicle system 200 according to the present embodiment includes a surrounding environment sensor group 10, a vehicle sensor group 20, a navigation system 30, a map database 40, a HMI50, an actuator controller 60, a vehicle control actuator group 70, a direction indicator 80, and a vehicle controller 100.

These device or systems are connected to each other by control area network (CAN) or other in-vehicle LAN for mutually exchanging information.

The surrounding environment sensor group 10 is a sensor group for detecting the state (external state) of the surrounding of the subject vehicle, it is provided in the vehicle. As shown in FIG. 1, the surrounding environment sensor group 10 may include, for example, a radar 11 and an imaging device 12.

The radar 11 detects objects around the subject vehicle. The radar 11 may include, millimeter wave radar, laser radar, ultrasonic radar, and laser rangefinder. The radar 11 detects an object, for example, by transmitting radio waves to the surrounding of the subject vehicle and receiving radio waves reflected by the object. Specifically, the radar 11 detects the direction of the object and the distance to the object. The radar 11 also detects the relative velocity (including the direction of movement) of the object relative to the subject vehicle in accordance with the direction to the object and the time change of the distance to the object. The radar 11 outputs the detected results to the vehicle controller 100.

In the present embodiment, the radar 11 is intended to detect the objects in all directions from the subject vehicle. For example, the radar 11 is provided on the front, side, and rear of the vehicle, respectively, and is composed of a forward radar for detecting an object in front of the vehicle, a side radar for detecting an object in the side of the vehicle, and a rear radar for detecting an object in the rear of the vehicle. The number and type of radars 11 included in the subject vehicle are not particularly limited.

The imaging device 12 images the object around the vehicle. The imaging device 12 may include, for example, a camera comprising a CCD or CMOS imaging device. The captured image captured by the imaging device 12 is output to the vehicle controller 100.

In the present embodiment, the imaging device 12 is intended to image objects in all directions from the subject vehicle. For example, the imaging device 12 is provided in front of the vehicle, side, and rear, respectively, and is composed of a front camera for imaging an object in front of the vehicle, a side camera for imaging an object on the side of the vehicle, the rear camera for detecting an object in the rear of the vehicle. The number and type of the imaging devices 12 included in the subject vehicle are not particularly limited.

The objects detected by the surrounding environment sensor group 10 include, for example, bicycles, motorcycles, vehicles (hereinafter, also referred to as other vehicles), road obstacles, traffic lights, road markings (including lane boundaries), and pedestrian crossings. For example, when another vehicle travels along the traveling direction of the subject vehicle around the subject vehicle, the radar 11 detects the direction and the distance to another vehicle and the relative speed of another vehicle relative to the subject vehicle in accordance with the position of the subject vehicle. Further, the imaging device 12 captures an image capable of determining the vehicle type of another vehicle, the size of another vehicle, and the shape of another vehicle.

Further, for example, when the subject vehicle is traveling in a specific lane among a plurality of lanes, the radar 11 detects a lane boundary line separating the lane where the subject vehicle is traveling and the lane located on the side of the lane, and also detects a distance from the subject vehicle to the lane boundary line. Further, the imaging device 12 captures an image capable of determining the type of the lane boundary line. Incidentally, for the lane boundary lines on both sides of the subject lane, the radar 11 detects the distance from the subject vehicle to each of the lane boundary line. Further, in the following description, the lane where the subject vehicle is traveling is referred to as the subject lane and the lane located on the side of the subject lane is referred to as the adjacent lane.

The vehicle sensor group 20 is a sensor group for detecting the state of the vehicle (internal state). As shown in FIG. 1, the vehicle sensor group 20 may include a vehicle speed sensor 21, an accelerometer 22, a gyro sensor 23, a steering angle sensor 24, an accelerator sensor 25, and a brake sensor 26.

The vehicle speed sensor 21 measures the rotational speed of the drive system such as a drive shaft, and detects the traveling speed of the subject vehicle in accordance with the measurement result. The vehicle speed sensor 21 is provided, for example, on a drive shaft rotating integrally with the wheels or wheels of the subject vehicle. The accelerometer 22 detects the acceleration of subject vehicle. The accelerometer 22 includes a longitudinal accelerometer for detecting the acceleration in the longitudinal direction of the subject vehicle, and a lateral accelerometer for detecting the lateral acceleration of the subject vehicle. The gyro sensor 23 detects the rotating speed of the subject vehicle, that is, the amount of movement (angular velocity) of the angle of the subject vehicle per unit time. The steering angle sensor 24 detects the steering angle of the steering wheel. The steering angle sensor 24 is, for example, provided on the steering shaft of the subject vehicle. The accelerator sensor 25 detects the amount of step-in (the position of the accelerator pedal) of the accelerator pedal. The accelerator sensor 25 is provided, for example, on a shaft of an accelerator pedal. The brake sensor 26 detects the amount of depression of the brake pedal (the position of the brake pedal). The brake sensor 26 is provided, for example, on the shaft of the brake pedal.

The detection result detected by the vehicle sensor group 20 is output to the vehicle controller 100. The detection results may include, for example, vehicle speed, acceleration (including longitudinal and lateral acceleration), angular velocity, amount of depression of the accelerator pedal, and amount of depression of the brake pedal of the subject vehicle.

The navigation system 30 is a system for guiding the occupant (including the driver) of the subject vehicle by indicating a route from the current position of the subject vehicle to the destination in accordance with the information of the current position of the subject vehicle. The navigation system 30 acquires the map information input from the map database 40 to be described later and the information of the destination input via a HMI50 from the occupant of the subject vehicle. The navigation system 30 generates a travel route of the vehicle in accordance with the input information. Then, the navigation system 30 outputs the information of the traveling route of the subject vehicle to the vehicle controller 100 and presents the information of the traveling route of the subject vehicle to the occupant of the subject vehicle through HMI50. Thus, the traveling route from the current position to the destination is presented to the occupant.

As shown in FIG. 1, the navigation system 30 includes a GPS31, a communicator 32, and a navigation controller 33.

The GPS31 acquires position data (Global Positioning System, GPS) that indicates the present position of the subject vehicle. The GPS31 acquires positional data of the subject vehicle by receiving radio waves transmitted from a plurality of satellite communications by a receiver. Further, the GPS31 can detect changes in the position information of the subject vehicles by receiving radio waves transmitted from a plurality of satellite communications periodically.

The communicator 32 acquires the surrounding state of the vehicle from the outside. The communicator 32 is, for example, a server or a system provided outside the vehicle, or a device capable of communicating with a communicator mounted on another vehicle.

For example, the communicator 32 acquires road traffic information from a road traffic information communication system (Vehicle Information and Communication System, VICS (registered trademark), hereinafter the same) by an information transmission device (beacon) or FM-multiplex broadcasting or the like provided on a road. The road traffic information may include, for example, traffic jam information in lane units, accident information, failure vehicle information, construction information, speed regulation information, lane regulation information, etc. It should be noted that the road traffic information does not necessarily include each of the above-mentioned information, and may include at least any one of the above-mentioned information.

Examples of the traffic jam information may include information of an area where traffic jam occurs, a distance of traffic jam, and a required time until the vehicle passes through the traffic jam. Examples of the accident information may include information of an area where an accident has occurred, the content of the accident, and the time required to leave a point in which the accident has occurred. Examples of the failure vehicle information may include information of the area where the failure vehicle exists, the number of the failure vehicle, and the time required to exit the area. Examples of the speed regulation information may include information of an area subject to speed regulation and a time zone of speed regulation. Examples of the construction may information include information of an area under construction, a time zone in which the construction is performed, and a time required to leave the area.

Further, for example, the communicator 32 acquires, from the communicator mounted on another vehicle, information on the relative speed of another vehicle with respect to the subject vehicle, information on the relative position of another vehicle with respect to the subject vehicle, and the like. Such communication performed by the subject vehicle and another vehicle is referred to as vehicle-to-vehicle communication. The communicator 32, by vehicle-to-vehicle communication, acquires information such as vehicle speed of another vehicle as surrounding information of the vehicle.

The information such as the relative speed of another vehicle may be acquired by another way. For example, the communicator 32 may acquire information including the position of another vehicle, the vehicle speed, and the traveling direction from VICS as surrounding information of the subject vehicle. The type of information acquired by the communicator 32 is not limited to the above type. For example, the communicator 32 can also acquire weather information of an area where the subject vehicle travels from a server distributing weather information. Further, for example, the communicator 32 can also acquire time information of the current time period of the area where the subject vehicle is traveling from a server distributing the time information.

The navigation controller 33 is a computer that generates a traveling route from the current position of the subject vehicle to the destination. For example, the navigation controller 33 may include a ROM (Read Only Memory) that stores a program for generating a travel path, a CPU (Central Processing Unit) that executes a program stored in the ROM, and a RAM (Random Access Memory) that functions as an accessible storage device.

The navigation controller 33 acquires information on the present position of the subject vehicle input from GPS31, road traffic information input from the communicator 32, map information input from the map database 40, and information on the destination of the vehicle input from HMI50. For example, it is assumed that the occupant of the subject vehicle has set the destination of the subject vehicle through HMI50. The navigation controller 33 generates a route from the current position to the destination in the lane unit as a traveling route of the subject vehicle in accordance with the position information of the subject vehicle, the information of the destination of the subject vehicle, the map information, and the road traffic information. The navigation controller 33 outputs the generated travel route information to the vehicle controller 100 and presents the information to the occupant of the vehicle via HMI50.

In the present embodiment, the traveling route of the vehicle may be any route as long as the vehicle can arrive at the destination from the current position, and other conditions are not limited. For example, the navigation controller 33 may generate the traveling route of the subject vehicle according to the terms set by the occupant. For example, when the occupant chooses to preferentially use a toll road to arrive at a destination, the navigation controller 33 may generate a traveling route using the toll road in accordance with the map information. Further, for example, the navigation controller 33, in accordance with the road traffic information, may generate a traveling route of the subject vehicle. For example, when traffic jam occurs on the way of the shortest route to the destination, the navigation controller 33 may search the detour route and generate a route having the shortest required time out of a plurality of detour routes thus searched as the traveling route.

The map database 40 stores map information. The map information includes road information and traffic rule information. The road information and the traffic rule information are defined by nodes and links (also referred to as road links) connecting the nodes. The links are identified at the lane level.

The road information relates to roads on which vehicles can travel. Each road link is associated with information relating to roads such as, for example, type of road, road width, road shape, propriety of straight travel, priority relation of travel, propriety of overtaking (entering or not to an adjacent lane), propriety of lane change although not limited. In addition, information on the installation position of traffic lights, the position of intersections, the entry direction of intersections, the type of intersections, and other intersections, for example, is linked to each road link.

The traffic rule information relates to a traffic rule that the vehicle should observe when traveling. Traffic rules may include pause on a route, park/stop prohibition, slow travel, speed limit, lane change prohibition, for example. The traffic rule information in a section defined by the road link is linked to each road link. For example, lane change prohibition information is linked to a road link in a lane change prohibition section. The traffic rule information may be linked not only to a road link but also to a particular point (latitude, route) on a node or a map, for example.

The traffic rule information may include not only information on traffic rules but also information on traffic lights. For example, information of the color currently displayed by the traffic signal, and/or information of the switching cycle of the display of the traffic signal may be linked to the road link of the intersection where the traffic signal is installed. The information on the traffic signal is acquired from VICS, for example, by the communicator 32, or from an information transmission device (e.g., optical beacon) provided on the roadway. The display information of traffic signal changes with the passage of time. Thus, the traffic rule information is updated every predetermined cycle.

The map information stored in the map database 40 may be high-precision map information suitable for automatic driving. The high-precision map information is acquired by, for example, communication with a server or a system provided outside the vehicle. Further, high-precision map information, information acquired in real time using the surrounding environment sensor group 10 (e.g., information of the object detected by the radar 11, the image of the surrounding of the vehicle captured by the imaging device 12) in accordance with, may be generated at any time.

Here, the autonomous driving in the present embodiment will be described. In the present embodiment, the autonomous driving means an driving mode other than the driving mode in which only the driver operates driving. For example, autonomous driving may include a case where a controller (not shown) supports a driver to operate driving or a controller (not shown) operates driving on behalf of the driver.

In the present embodiment, the vehicle system 200 includes the map database 40, but the map database 40 may be provided outside the vehicle system 200. For example, the map information may be previously stored in a portable storage device (e.g., an external HDD, a flash memory). In this case, the storage device functions as the map database 40 by electrically connecting the vehicle controller 100 and the storage device storing the map information.

The HMI50 is an interface for outputting and inputting data between a passenger of the vehicle and the vehicle system 200 (Human Machine Interface, HMI). Examples of HMI50 may include a display for displaying text or video information and a speaker for outputting sound such as music or sound.

The transmission and reception of data via the HMI50 will be described. For example, when an occupant inputs a destination to the HMI50, the destination is outputted from the HMI50 to the navigation system 30. This enables the navigation system 30 to acquire information on the destination of the vehicle. Further, for example, when the navigation system 30 generates a traveling route to the destination, the navigation system 30 outputs the traveling route data to the HMI50. Then, the HMI50 outputs the information of the traveling route from the display and/or the speaker. Thus, the information of the traveling route to the destination is presented to the occupant of the subject vehicle. The information on the traveling route to the destination may include for example, route guidance and required time to the destination.

Further, for example, when the occupant inputs a lane change execution command to the HMI50, the command is output from the HMI50 to the vehicle controller 100. This allows the vehicle controller 100 to start the control process of lane change. Further, for example, when the vehicle controller 100 sets the target trajectory for the lane change, the information of the target trajectory is outputted from the vehicle controller 100 to the HMI50. Then, the HMI50 outputs the information of the target trajectory from the display and/or the speaker. This presents the information of the target trajectory for the lane change to the occupant of the subject vehicle. The information of the target trajectory for the lane change may include, for example, an entry position specified on an adjacent lane and a target trajectory at the time of lane change. The target trajectory and the entry position will be described later.

The actuator controller 60 controls travel of the subject vehicle. The actuator controller 60 includes a steering control mechanism, an accelerator control mechanism, a brake control mechanism, an engine control mechanism, and the like. The actuator controller 60 acquires a control signal input from the vehicle controller 100 to be described later. The actuator controller 60 enables the autonomous driving of the subject vehicle by controlling the vehicle control actuator group 70 in response to control signal from the vehicle controller 100. For example, the actuator controller 60 calculates a steering angle required for the movement of the vehicle, and an accelerator depression amount or a brake depression amount according to the moving speed in response to a control signal for moving the subject vehicle from the subject lane to the adjacent lane. The actuator controller 60 outputs the calculated various parameters to the vehicle control actuator group 70.

The control of each mechanism may be performed completely automatically, or may be performed in a manner to assist the driving operation of the driver. The control of each mechanism can be interrupted or stopped by an interventional operation of the driver. The travel control method by the actuator controller 60 is not limited to the above-described control method, and other well-known methods can be used.

The vehicle control actuator group 70 is various actuators for driving the subject vehicle. As shown in FIG. 1, the vehicle control actuator group 70 may include a steering actuator 71, an accelerator actuator 72, and a brake control actuator 73.

The steering actuator 71 controls the steering direction and the steering amount of the steering of the subject vehicle in response to a signal input from the actuator controller 60. The accelerator actuator 72 controls the degree of acceleration of the subject vehicle in response to a signal input from the actuator controller 60. The brake control actuator 73 controls the braking operation of the brake device of the subject vehicle in response to a signal input from the actuator controller 60.

The direction indicator 80 has a lamp for blinking inside, when the driver of the vehicle operates the direction instruction switch (not shown), it lights in orange. The direction indicator 80 is a device for indicating the direction of the subject vehicle to proceed to the surroundings when the subject vehicle turns right and left or changes lanes. The direction indicator 80, for example, is integrally provided on the left and right of the front and rear ends of the vehicle. For example, the direction indicator 80 is composed of a left-hand direction indicator and a right-hand direction indicator.

Further, in the present embodiment, the control signal is input from the vehicle controller 100 to the direction indicator 80. The control signal may include, for example, a signal for blinking the direction indicator 80 that is turned off (also referred to as a blink signal), a signal for turning off the direction indicator 80 that is blinking (also referred to as a turn-off signal). For example, when a blink signal is input to the direction indicator 80 to blink the left direction indicator, the direction indicator 80 lights the left direction indicator. Thereafter, when the off signal to turn off the left direction indicator is input to the direction indicator 80, the direction indicator 80 turns off the left direction indicator. Thus, the direction indicator 80, in addition to the driver of the vehicle, is controlled by the vehicle controller 100.

Next, the vehicle controller 100 will be described. The vehicle controller 100 according to one or more embodiments of the present invention is configured by a computer installed with hardware and software. Specifically, the server 1 is configured to include a read only memory (ROM) that stores programs, a central processing unit (CPU) that executes the programs stored in the ROM, and a random access memory (RAM) that serves as an accessible storage device. As the operation circuits, MPUs (Micro Processing Unit), DSPs (Digital Signal Processor), ASIC (Application Specific Integrated Circuit, and FPGA (Field Programmable Gate Array can be used instead of or in addition to CPUs. The controller 101 shown in FIG. 1 corresponds to a CPU. The storage 109 shown in FIG. 1 corresponds to a ROM and a RAM.

In the present embodiment, a program to be executed by the controller 101 is stored in advance in the storage 109, but the program may be stored in other device. For example, the program may be stored on a computer readable and portable computer readable recording medium (e.g., disk media, flash memory, etc.). In this case, the controller 101 executes a program downloaded from a computer-readable recording medium. In other words, the vehicle controller 100 may be configured to include only the operating circuit and download the program externally.

As shown in FIG. 1, the controller 101 includes an information acquiring unit 102, a situation recognizing unit 103, a specifying unit 104, a determining unit 105, a control setting unit 106, a space presence determining unit 107, and a travel control unit 108. These blocks enable the functions described later by the software established in the ROM. In the present embodiment, the functions of the controller 101 are divided into seven functional blocks, and the functions of the respective functional blocks are described. However, the functions of the controller 101 need not necessarily be divided into seven blocks, and may be divided into six or less functional blocks or eight or more functional blocks. The function of the controller 101 is not limited to the function of the function block described below, but may include, for example, a control function of a navigation system.

The function of the information acquiring unit 102 will be described. The information acquiring unit 102 acquires various information from surrounding the environment sensor group 10, the vehicle sensor group 20, the navigation system 30, the map database 40, and each of the HMI50.

The information acquiring unit 102 acquires surrounding information (also referred to as external information of the subject vehicle) of the subject vehicle, which is detected by the surrounding environment sensor group 10. The surrounding information of the subject vehicle includes a detection result detected by the radar 11 and an image captured by the imaging device 12. Further, the information acquiring unit 102 acquires information (also referred to as internal information of the subject vehicle) of the state of the subject vehicle, which is detected by the vehicle sensor group 20. The internal information of the subject vehicle includes the vehicle speed, acceleration, angular velocity, the amount of depression of the accelerator pedal, and the amount of depression of the brake pedal. Further, the information acquiring unit 102 acquires the current position of the subject vehicle, the traveling route of the subject vehicle, and the road traffic information from the navigation system 30. The information acquiring unit 102 acquires map information (including road information and traffic rule information) from the map database 40. The data acquiring unit 102 acquires a lane change command from the HMI50. The various types of information acquired by the information acquiring unit 102 are used in the respective functions described later.

The function of the situation recognizing unit 103 will be described. The situation recognizing unit 103 recognizes the situation around the subject vehicle in accordance with the various information acquired by the information acquiring unit 102 and identifies the lane changing point of the subject vehicle.

The situation recognizing unit 103 recognizes the situation in the surrounding of the subject vehicle. For example, the situation recognizing unit 103 recognizes the presence or absence of an obstacle in the surrounding of the subject vehicle, the direction to the obstacle, the distance to the obstacle, and the relative speed of the obstacle relative to the subject vehicle from the detection result detected by the radar 11 and the image captured by the imaging device 12. This enables the situation recognizing unit 103 to grasp the number of obstacles, the positional relationship between each obstacle and the subject vehicle, the moving speed of the obstacle.

Further, for example, the situation recognizing unit 103 recognizes the distance between the subject vehicle and the lane boundary line from the detection result detected by the radar 11 and the image captured by the imaging device 12. This enables the situation recognizing unit 103 to grasp which position of the subject vehicle is traveling in the subject lane in the lane width direction. In the following, the position of the vehicle in the range of the lane is also referred to as the horizontal position of the vehicle relative to the lane. The situation recognizing unit 103, for example, sets a specific position on the vehicle center line as the horizontal position of the vehicle with respect to the lane although not particularly limited.

Further, for example, the situation recognizing unit 103 specifies the number of lanes of the road where the subject vehicle is traveling in accordance with the result detected by the radar 11, the image captured by the imaging device 12, and the map information in the map database 40. When specifying a plurality of lanes along the same direction as the traveling direction of the subject vehicle, the situation recognizing unit 103 specifies a lane in which the subject vehicle is traveling among a plurality of the lanes.

The situation recognizing unit 103 specifies the lane changing point in accordance with the surrounding situation of the subject vehicle and the traveling route of the subject vehicle after recognizing the surrounding situation of the subject vehicle. The situation recognizing unit 103 acquires the current position of the subject vehicle and the traveling route of the subject vehicle from the navigation system 30 and specifies the lane changing point in accordance with the current position of the subject vehicle and the traveling route. The lane changing point indicates a point where the subject vehicle needs to be moved from the subject lane to the adjacent lane when traveling in the traveling route. The situation recognizing unit 103 specifies a point where to change the lane in the traveling route by referring to the traveling route of the subject vehicle.

The situation recognizing unit 103 specifies a target point in the traveling route such as an intersection, which is a point for switching the traveling direction, or an interchange, which is a point for changing the course in a direction different from the traveling direction of the vehicle. Next, the situation recognizing unit 103, for changing the traveling direction of the subject vehicle at the target point, specifies a lane changing point where needs to move the vehicle from the subject lane to the adjacent lane.

For example, the subject vehicle that travels in the leftmost lane of a plurality of lanes needs to move to the right lane for turning right at an intersection ahead of the current position according to the traveling route. In such a scene, the situation recognizing unit 103 specifies an intersection that requires a right turn as a target point. The situation recognizing unit 103 specifies a point that is a predetermined distance short of the intersection (target point) to be turned right as a lane changing point on the traveling route. For example, the lane changing point is set at a position several 100 m short of the target point on the traveling route. The lane changing point does not necessarily need to be set at a point, it may be performed in a predetermined section. As another example, the lane changing point may include a predetermined section in front of the branch point provided on the expressway, a predetermined section in front of the merge point provided on the expressway, and a predetermined section in front of the destination of the road vehicle.

The branch point provided on the expressway include the branch points to each direction and the branch points between the main line and the exit. In the present embodiment, the length of the lane changing section is not particularly limited.

The functions of specifying unit 104 will be described. The specifying unit 104 specifies an entry position that indicates the position of the entry destination of the subject vehicle and is located on a lane adjacent to the subject lane in accordance with the surrounding information of the subject vehicle. For example, the specifying unit 104 specifies the entry position that has a predetermined length (distance) or more from in the direction along the traveling direction of the vehicle on the adjacent lane in accordance with the result detected by the radar 11 and the image captured by the imaging device 12. The predetermined distance is a preset distance and is an experimentally determined distance.

Further, the specifying unit 104 specifies a rear vehicle located behind the entry position after specifying the entry position. For example, the specifying unit 104 specifies, among a plurality of other vehicles located behind the entry position, a rear vehicle located nearest to the entry position in the adjacent lane. For specifying the rear vehicle, the specifying unit 104 may specify a predetermined area behind the entry position in advance and specify a rear vehicle inside the predetermined area. For example, the specifying unit 104 specifies a predetermined area with a length corresponding to the vehicle speed of the subject speed in a direction along the traveling direction of the subject vehicle. The predetermined region is not particularly limited. The predetermined area may be stored in a storage such as a ROM.

Further, the specifying unit 104 determines that the subject vehicle is going to enter the front of another vehicle to change lanes after specifying the rear vehicle. The number of lanes for the subject vehicle to traverse when changing lanes is not particularly limited. The number of lanes of the road on which the subject vehicle travels may be at least two, the subject lane and the adjacent lane. In the following description, the vehicle identified as a rear vehicle will be described simply referred to as another vehicle.

Next, the functions of determining unit 105 will be described. The determining unit 105 determines whether a factor to distract the driver of another vehicle is present in accordance with the surrounding information of the subject vehicle. The distractive factor for the driver of another vehicle is a component or a nature involved in the event of distracting the driver of another vehicle. Particularly for drivers of another vehicle, the distractive factor for the driver relates to the operation of another vehicle. In the present embodiment, the distractive factors for the driver of another vehicle include not only the factors to certainly distract the driver, but also the factors that may distract the driver. In the present embodiment, the distractive factor for the driver does not include the subject vehicle.

The distractive factor for the driver may include, for example, a preceding vehicle preceding another vehicle. For example, the determining unit 105 determines the distractive factor for the driver of another vehicle is present by recognizing the preceding vehicle of another vehicle on the adjacent line using the result detected by the radar 11 and the image captured by the imaging device 12. This determination is in accordance with the viewpoint that the driver of another vehicle performs the driving operation while paying attention to the existence of the preceding vehicle. Incidentally, the lane in which the preceding vehicle travels may be a lane other than the adjacent lane in which another vehicle travels. For example, the lane in which the preceding vehicle travels may be the subject lane, or for a road with three or more lanes, it may be a lane adjacent to the opposite side of the subject lane relative to the adjacent lane.

The distractive factor for the driver of another vehicle may include, not only the preceding vehicle, but also the lighting of the direction indicator of the preceding vehicle. For the preceding vehicle being on a lane adjacent to the opposite side of the subject lane relative to the adjacent lane, the lighting of the direction indicator of the preceding vehicle may distract the driver of another vehicle. This is in accordance with the viewpoint that the driver of another vehicle pays special attention to driving because the preceding vehicle may enter ahead of another vehicle for the lane change.

The distractive factor for the driver of another vehicle may include the behavior, shape, or color of the preceding vehicle. The behavior of the preceding vehicle may include, for example, repeating the lane change more than a predetermined number of times per unit time. The shape or color of the preceding vehicle may include, for example, an unique shape or an unique color of the preceding vehicle. This is in accordance with the viewpoint that drivers of another vehicle tend to pay attention to vehicles with a large number of lane changes. It is also in accordance with the point of view that drivers of another vehicle may be distracted by the vehicle with the shapes or colors different from normally familiar vehicles.

The distractive factors for the driver may include displays of traffic lights. For example, the determining unit 105 determines that the distractive factor for the driver of another vehicle is present by recognizing a traffic light provided in front of another vehicle from the image captured by the imaging device 12. This determination is in accordance with the viewpoint that the driver of another vehicle performs the driving operation while paying attention to the signal display of the traffic light. Note that the place where the traffic light is provided is not particularly limited. The determining unit 105 specifies the traffic light as a distractive factor for the driver of another vehicle when the recognized traffic light is determining traffic flow in the adjacent lane.

The distractive factor for the driver may include a site of a traffic accident. For example, the determining unit 105 recognizes that a traffic accident has occurred in an oncoming lane by the information from VICS. The oncoming lane is a lane that is opposed to the subject lane and the adjacent lane. Then, the determining unit 105 determines that the distractive factor for the driver of another vehicle is present when the determining unit 105 recognizes that another vehicle is going to pass near the accident site. This determination is in accordance with the viewpoint that drivers of another vehicle perform driving operations while paying attention to the scene of a traffic accident.

The distractive factor for the driver may include an emergency vehicle. The emergency vehicle may include, for example, a police vehicle, an ambulance, and a fire engine. For example, the determining unit 105 recognizes, in the rear of the subject vehicle or another vehicle or in the oncoming lane, the emergency vehicle traveling while sounding a siren, from the image captured by the imaging device 12. The determining unit 105 determines that the distractive factor for the driver of another vehicle is present by recognizing the emergency vehicle. This determination is in accordance with the viewpoint that drivers of other vehicles perform driving operations while paying attention to the existence of emergency vehicles.

The distractive factors for the driver include factors acting on the hearing of the driver in addition to the factors acting on the vision of the driver. For example, the distractive factors for the driver may include voice guidance for car navigation, emergency earthquake information, etc. For example, the determining unit 105 estimate that voice guidance relating to the speed limit is going to be performed by the car navigation by recognizing passing through the speed limit sign in accordance with the current position of the subject vehicle and the map information. In this case, the determining unit 105 determines that a distractive factor for the driver of another vehicle is present. This determination is in accordance with the viewpoint that drivers tend to respond to voice guidance by car navigation. For example, the determining unit 105 may determines the distractive factor for the driver in accordance with the information obtained by the inter-vehicle communication when the determining unit 105 can acquire the information of the car navigation of another vehicle using inter-vehicle communication.

For example, the determining unit 105 determines that the distractive factor for the driver of another vehicle is present when having recognized an emergency earthquake information from VICS. This determination is in accordance with the point of view that drivers are responding to emergency earthquake early warning and tend to scrape their attention from driving operation.

The distractive factors for the driver include factors indirectly acting on the driver in addition to the factors directly acting on the driver. Such a distractive factor for the driver may include the shape of a lane. For example, the determining unit 105 determines that a distractive factor for the driver of another vehicle is present when having recognized the shape of the adjacent lane being a steep curve in accordance with the map information. This determination is in accordance with the viewpoint that, when driving a steep curve, drivers tend to watch the lane and lose their attention to the surrounding situation.

The functions of control setting unit 106 will be described. The control setting unit 106 sets the lane change time. The lane change time is the time required for the subject vehicle to change lanes from the subject lane to the adjacent lane. Specifically, in the present embodiment, the lane change time includes a time required for each control performed by the travel control unit 108. The control performed by the travel control unit 108 is a lighting control of a direction indicator for lighting a direction indicator 80 provided on the adjacent lane side and a lane change control for moving the subject vehicle from the subject lane toward the entry position specified on the adjacent lane. In other words, in the present embodiment, the lane change time includes the lighting time (also referred to as the first time) of the direction indicator 80 provided on the adjacent lane side, and the time (also referred to as the fourth time) required to move the subject vehicle from the subject lane toward the entry position specified on the adjacent lane.

The control setting unit 106 sets a different lane change time according to a determination result regarding the presence of a distraction factor for the driver of another vehicle. Specifically, in the present embodiment, the control setting unit 106 sets the lane change time longer when a distractive factor for the driver of another vehicle is determined to be present, as compared with the case where the factor does not exist. The control setting unit 106, when the distractive factor is determined to be present, sets at least one of the lighting time of the direction indicator 80 and the time required to move the vehicle from the subject lane to the specified entry position on the adjacent lane longer than when no distractive factor is determined.

For example, in setting the lane change time, the control setting unit 106 acquires a preset lighting time of the direction indicator 80 from a storage such as a ROM. The control setting unit 106 add a predetermined time to the preset lighting time of the direction indicator 80 when the distractive factor is determined to be present. This sets the lane change time longer than when no distractive factor is determined to be present. The predetermined time is an experimentally determined and is stored in advance in a storage such as a ROM. For example, the predetermined time is a time corresponding to the vehicle speed of the subject vehicle. In the following, for convenience of explanation, a predetermined time for adding in order to lengthen the lane change time will be described as an additional time.

Further, for example, in setting the lane change time, the control setting unit 106 acquires vehicle speed information when moving the vehicle from the subject lane to the adjacent lane from a storage such as a ROM. The vehicle speed information includes information on the vehicle speed (hereinafter, also referred to as moving vehicle speed) at the time of changing the lane from the subject lane to the adjacent lane. The moving vehicle speed may include a relative speed relative to a particular reference vehicle speed, e.g., the speed of the subject vehicle. The control setting unit 106 subtracts a predetermined speed from a preset moving vehicle speed to set a moving vehicle speed when the distractive factor for the driver is present. The slower the moving vehicle speed requires the longer the time to move the subject vehicle toward the entry position. This sets the lane change time longer than when none of the distraction factor for the driver of another vehicle is present. The predetermined speed is an experimentally determined and is stored in advance in a storage such as a ROM. In the following, for convenience of explanation, a predetermined speed to be subtracted in order to lengthen the lane change time will be described as a subtractive speed.

In the above description, the additional time may be a time corresponding to the relative speed between the subject vehicle and the preceding vehicle. Additionally, the subtractive speed may be a speed corresponding to the relative speed between the subject vehicle and the preceding vehicle. The preceding vehicle is a vehicle that travels on a lane adjacent to the adjacent lane on the opposite side of the subject lane with respect to the adjacent lane and is a vehicle that travels ahead of another vehicle. For example, the control setting unit 106 recognizes that the preceding vehicle is traveling on the side opposite to the subject lane across the adjacent lane. The control setting unit 106 acquires information on the relative speed of the preceding vehicle with respect to the subject vehicle by inter-vehicle communication. The control setting unit 106 sets the additional time or the subtractive speed according to the relative speed of the preceding vehicle with respect to the subject vehicle. For example, the control setting unit 106 sets the additional time longer as the relative speed of the preceding vehicle with respect to the subject vehicle is lower. For example, the control setting unit 106 sets the subtractive speed higher as the relative speed of the preceding vehicle with respect to the subject vehicle is lower. This sets the lane change time longer as the speed difference between the subject vehicle and the preceding vehicle is smaller.

The functions of the space presence determining unit 107 will be described. The space presence determining unit 107 determines whether a space where the vehicle enters (hereinafter, also referred to as an entry space) is present at the entry position specified by the specifying unit 104 in accordance with the surrounding information of the subject vehicle. The entry space is a space between the front vehicle and the rear vehicle with a predetermined or longer length of the direction along the traveling direction of the subject vehicle.

The space presence determining unit 107 determines whether the entry space is present in the entry position in accordance with the inter-vehicle distance of the front vehicle and the rear vehicle. For example, the space presence determining unit 107 determines that the entry space is present in the entry position when the inter-vehicle distance of the front vehicle and the rear vehicle is equal to or greater than a predetermined distance. On the other hand, the space presence determining unit 107 determines that no entry space is present in the entry position when the inter-vehicle distance of the front vehicle and the rear vehicle is less than a predetermined distance. The predetermined distance is a distance at which the driver of the front vehicle and the rear vehicle does not feel any anxiety when the subject vehicle entering, which is set in advance. The predetermined distance may include a value obtained by adding a margin to the distance (vehicle length in the traveling direction) between the front end and the rear end of the subject vehicle in a direction along the traveling direction of the subject vehicle.

The functions of travel control unit 108 will be described. The travel control unit 108 controls the traveling of the subject vehicle in the control processing of the lane changing. In the present embodiment, the travel control unit 108 executes the lighting control and the lane changing control of the direction indicator in accordance with the lane change time. Hereinafter, each control will be described in detail.

The travel control unit 108 executes lighting control of the direction indicator for lighting the direction indicator 80 provided on the adjacent lane side. For example, the travel control unit 108 generates a control signal (lighting signal) for lighting the direction indicator 80 provided on the adjacent lane side and outputs a lighting signal to the direction indicator 80. At this time, the travel control unit 108 sets the lighting timing and the lighting time of the direction indicator 80 so as to satisfy the lane changing control time set by the control setting unit 106. Then, the travel control unit 108 outputs a lighting signal at the lighting timing of the direction indicator to the direction indicator 80. Thereafter, the travel control unit 108 outputs a turn-off signal to the direction indicator 80 when the set lighting time has elapsed. This enables the lighting control of the direction indicator 80 with reflecting the lane change time.

Further, the travel control unit 108 executes the lane changing control for moving the subject vehicle toward the entry position set on the adjacent lane from the subject lane. The travel control unit 108 generates a target trajectory for the subject vehicle to change the lane using the current position of the vehicle as a start point and the entry position as an end point. The travel control unit 108 sets the subject vehicle speed and the steering angle when the vehicle travels along the target trajectory. The travel control unit 108 outputs various control signals to the actuator controller 60. At this time, the travel control unit 108 sets the vehicle speed and the steering angle of the subject vehicle so as to satisfy the lane changing control time set by the control setting unit 106. This enables the lane changing control with reflecting the lane change time. When the subject vehicle reaches the entry position, the travel control unit 108 terminates the blinking of the direction indicator 80 and terminates the lane changing control.

Further, the travel control unit 108 controls the traveling of the subject vehicle so as to wait the subject vehicle at a predetermined position before reaching the entry position when the space presence determination unit 107 determines no entry space to be present at the entry position. For example, the travel control unit 108 sets a standby position where the target trajectory and the lane boundary line intersect. The travel control unit 108 controls the traveling of the subject vehicle so as to move the subject vehicle to the standby position. For example, the travel control unit 108 sets the vehicle speed and the steering angle to reach the standby position, the vehicle speed at the standby position, the angle at which the front end of the subject vehicle faces in the standby position, and the like, and outputs a control signal including the set contents to the actuator controller 60.

Further, the travel control unit 108 sets the subject vehicle speed and the steering angle along the target trajectory when the space presence determining unit 107 determines the entry space to be present in the entry position. The travel control unit 108 outputs various control signals to the actuator controller 60. This allows the subject vehicle to change lanes from the subject lane to the adjacent lane along the target trajectory, thus to enter the position between the front vehicle and the rear vehicle. The timing of executing the process of moving the subject vehicle to the entry position is not limited. The travel control unit 108 is allowed to move the subject vehicle to the entry position when the entry space is determined to be present at the entry position.

Figure 2A:
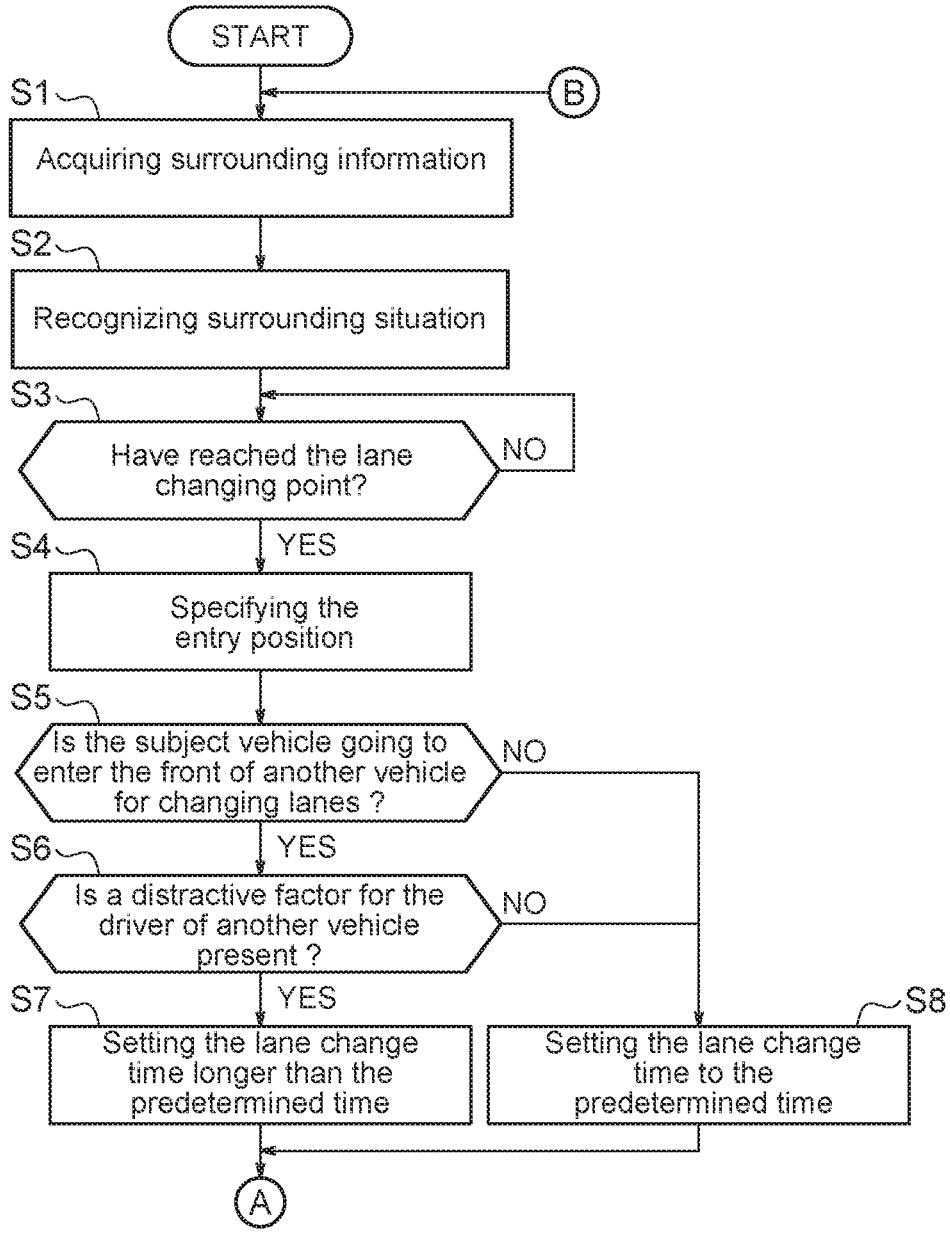
FIG. 2A is a flowchart of a control process executed by the vehicle control device according to the first embodiment of the present invention.
Figure 2B:
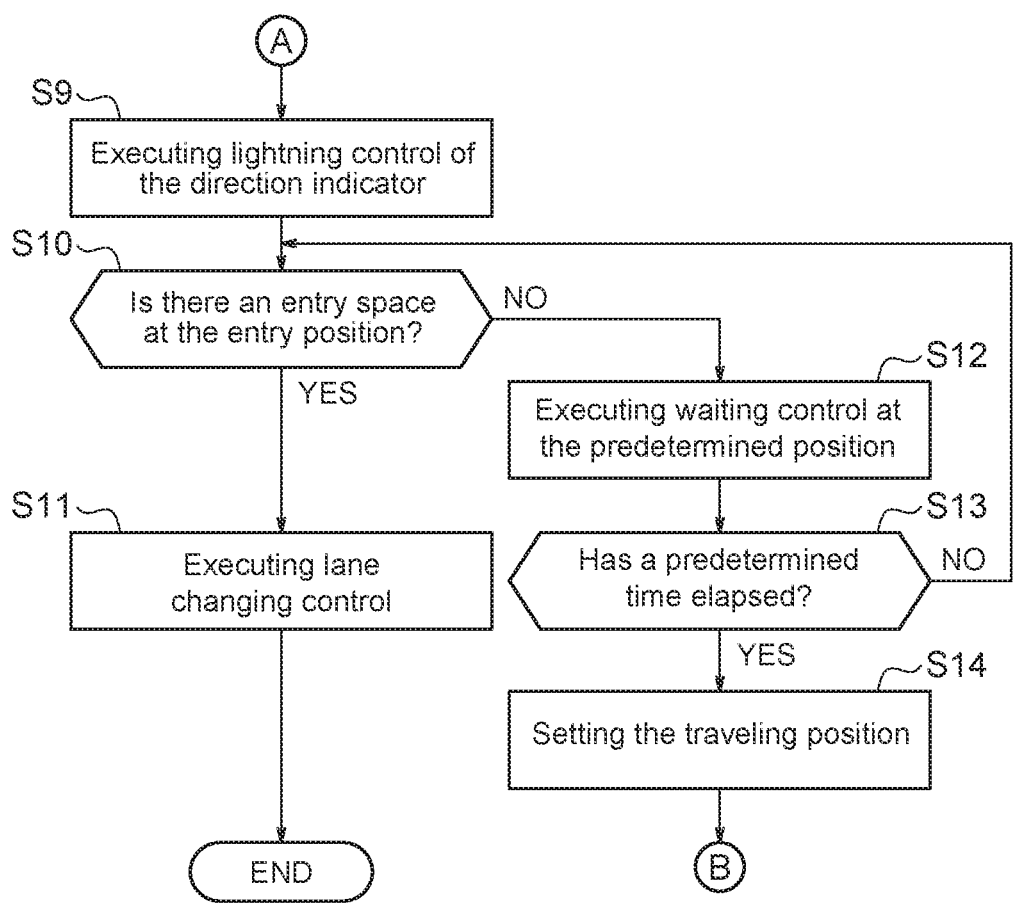
FIG. 2B is a flowchart of a control process executed by a vehicle control device according to the first embodiment

A control flow of the controller 101 according to the present embodiment will be described with reference to FIGS. 2A and 2B. FIG. 2A and FIG. 2B are flowcharts of a control process executed by the vehicle controller 100 according to the present embodiment. Further, with reference to FIG. 3, an example of the traveling of the subject vehicle that enabled by the control processing performed by the controller 101 will be described. The control of each may be performed completely automatically or may be performed in a manner to assist the driving operation of the driver.

In step S1, the controller 101 acquires surrounding information of the subject vehicle. For example, the controller 101 acquires information from the surrounding environment sensor group 10 about the direction to another vehicle and the distance to another vehicle, the relative speed of another vehicle to the subject vehicle, the vehicle type of another vehicle, the size of another vehicle, and the shape of another vehicle as the surrounding information of the subject vehicle. Further, for example, the controller 101 acquires the traffic jam information of the road including the subject lane as the surrounding information of the subject vehicle from the communicator 32. Incidentally, the controller 101 acquires the external information and the internal information of the subject vehicle at a predetermined cycle while executing the control processing after step S2. The traveling state is expressed by the position of the vehicle, the vehicle speed, etc.

In step S2, the controller 101 recognizes the situation around the subject vehicle in accordance with surrounding information of the subject vehicle acquired in step S1.

In step S3, the controller 101 specifies a section for the subject vehicle to change the lane (lane changing point). Further, the controller 101 compares the current position of the subject vehicle with the lane changing point and determines whether the subject vehicle has reached the lane changing point. When the subject vehicle is determined to have reached the lane changing point, the process proceeds to step S4. On the other hand, when the subject vehicle is determined not to have reached the lane changing point, the system stands by in Step S3.

In step S4, the controller 101 specifies an entry position located on the adjacent lane and indicating the position of the entry destination of the subject vehicle in accordance with the surrounding information of the subject vehicle. For example, the specifying unit 104 specifies an entry position where a distance (length) along the traveling direction of the vehicle is a predetermined distance or more on an adjacent lane. Further, the controller 101 specifies the vehicle located in front of the entry position as a front vehicle and the vehicle located behind the entry position as a rear vehicle when at least one of the front vehicle and the rear vehicle sandwiching the entry position is present.

In step S5, in accordance with the surrounding information of the subject vehicle, the controller 101 determines whether the subject vehicle is going to enter the front of another vehicle for changing lanes. For example, when the rear vehicle is specified in step S4, the controller 101 determines that the subject vehicle is going to enter the front of another vehicle for changing lanes. On the other hand, when the rear vehicle is not specified in Step S4, the controller 101 determines that the subject vehicle is not going to enter the front of another vehicle. The rear of the entry position may include, for example, an area with a length corresponding to the vehicle speed of the subject vehicle in a direction along the traveling direction of the subject vehicle. When the subject vehicle is determined to enter the front of another vehicle to change lanes, the scene proceeds to step S6. On the other hand, when the subject vehicle is determined not to enter the front of another vehicle, the process proceeds to step S8.

In step S5, when the subject vehicle is determined to enter the front of another vehicle to the change lanes, the scene proceeds to step S6. In step S6, the controller 101, in accordance with the surrounding information of the subject vehicle, determines whether a distractive factor for the driver of another vehicle is present. For example, when the controller 101 recognizes a vehicle preceding another vehicle in the adjacent lane, determines that a distractive factor for the driver of another vehicle is present. When a distractive factor for the driver of another vehicle is determined to be present, the process proceeds to step S7. On the other hand, when no distractive factor is determined, the process proceeds to step S8.

When a distractive factor is determined to be present in step S6, the process proceeds to step S7. In step S7, the controller 101 sets the lane change time longer than a predetermined time set in advance. For example, it is assumed that in step S6, the controller 101 specifies a vehicle that travels on a lane adjacent to the adjacent lane on the opposite side of the subject lane and precedes another vehicle. In this case, the controller 101 sets a longer lighting time of the direction indicator 80 as the relative speed between the vehicle and the preceding vehicle is lower. This sets the additional time longer, and thus, sets the lane change time longer than the predetermined time.

Figure 3:
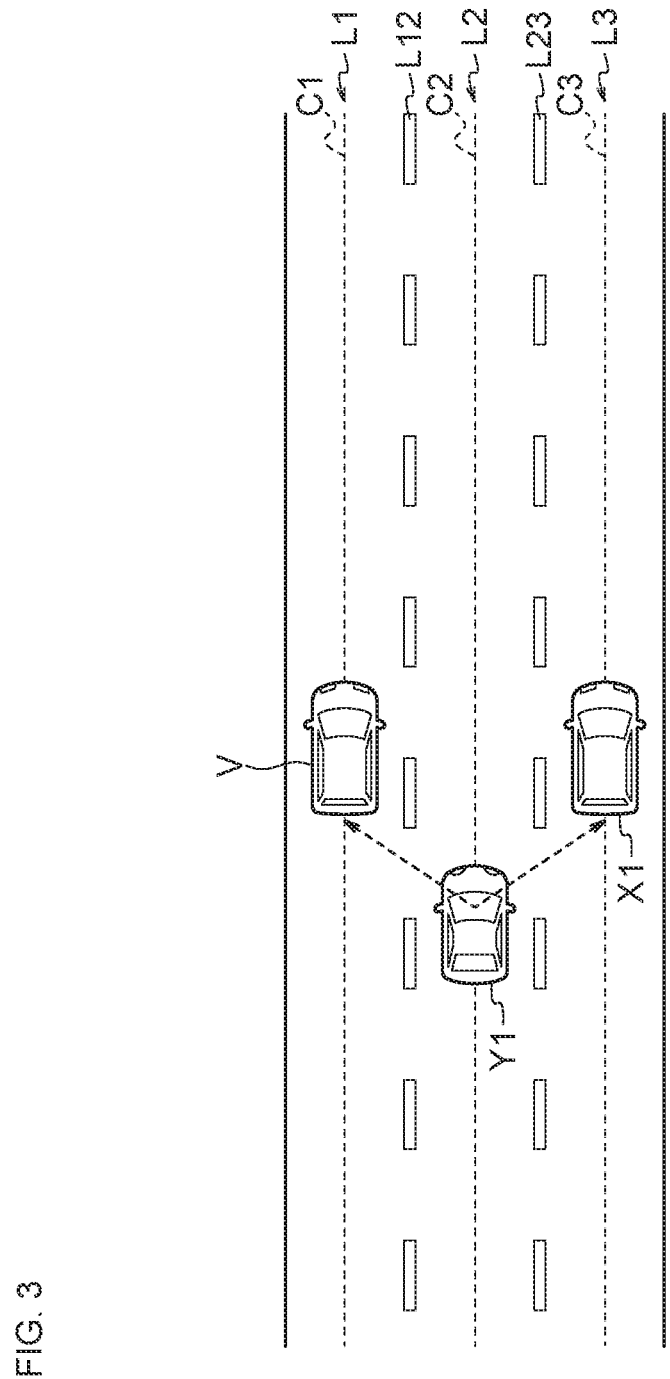
FIG. 3 is an example of the traveling of the subject vehicle when the process in FIG. 2A

FIG. 3 is an example of a scene in which the vehicle V is changed from a lane $L_1$ to a lane $L_2$ on a road with three lanes on one side (a lane $L_1$, a lane $L_2$, and a lane $L_3$). The lane $L_2$ is a lane adjacent to the lane $L_1$ to the right of the vehicle V. The lane $L_3$ is a lane adjacent to the lane $L_2$ to the right of the vehicle V. A lane border $L_{12}$ is provided between the lane $L_1$ and the lane $L_2$. A lane border $L_{2\_3}$ is provided between the lane $L_2$ and the lane $L_3$. A vehicle traveling on the lane $L_2$ is another vehicle $Y_1$. A vehicle traveling on the lane $L_3$ is another vehicle $X_1$. The scene in FIG. 3 is an exemplary scene after the processes of steps S1 to S7 in the FIG. 2A are executed. Further, in FIG. 3, the dashed arrow extending from another vehicle $Y_1$ indicates the line of sight of the driver of another vehicle $Y_1$. In FIG. 3, it is assumed that the driver of another vehicle $Y_1$ is paying attention to the subject vehicle V and another vehicle $X_1$. Further, in FIG. 3, the center line $C_1$ is the center line of the lane $L_1$ along the progress direction of the subject vehicle V, the center line $C_2$ is the center line of the lane $L_2$ along the progress direction of the subject vehicle V, and the center line $C_3$ is the center line of the lane $L_3$ along the progress direction of the subject vehicle V.

In the scene in FIG. 3, the controller 101 determines that the subject vehicle V has reached the lane changing point (not shown) (YES in step S3), and specifies the entry position in front of another vehicle $Y_1$ (step S4). In step S5, the controller 101 specifies another vehicle $Y_1$ located behind the entry position as the rear vehicle, and determines that the subject vehicle V enters the front of another vehicle $Y_1$ for the lane change. The controller 101 specifies another vehicle $X_1$ traveling in front of another vehicle $Y_1$ in the lane $L_3$ as the preceding vehicle in accordance with the surrounding information of the subject vehicle. The controller 101 determines that a distractive factor for the driver of another vehicle $Y_1$ is present because of another vehicle $X_1$ (step S6). In operation S7, the controller 101 sets the additional time or the subtractive speed in accordance with the relative speed of the vehicle V and the relative speed of the vehicle $X_1$.

Returning to the FIG. 2B, a flowchart of the lane changing process will be described. In step S9, the controller 101 executes the lighting control of the direction indicator in accordance with the lane change time set in step S7. For example, the controller 101 outputs the lighting signal and the turning-off signal to the direction indicator 80 so as to satisfy the lighting time of the direction indicator 80 among the lane change time.

In step S10, the controller 101 determines whether an entry space is present in the entry position set in step S4. For example, the controller 101 determines that the entry space is present in the entry position when the inter-vehicle distance of the front vehicle and another vehicle (rear vehicle) is equal to or greater than a predetermined distance. On the other hand, the controller 101 determines that no entry space is present in the entry position when the inter-vehicle distance of the front vehicle and the rear vehicle is less than a predetermined distance. When the entry space is determined to be present in the entrance position, the process proceeds to step S11. On the other hand, when no entry space is determined, the process proceeds to step S12.

If the entry space is determined to be present in the entry position in step S10, the process proceeds to step S11. In step S11, in accordance with the lane change time set in step S7, the controller 101 executes the lane changing control from the subject lane to the adjacent lane and terminates the vehicle changing process. For example, the controller 101 sets the vehicle speed and steering angle of the subject vehicle so as to satisfy the time required to move toward the entry position among the lane change time.

When no entry space is determined to be present in step S10, the process proceeds to step S12. In step S12, the controller 101 keeps the subject vehicle waiting at a predetermined position. For example, the controller 101 keeps the subject vehicle waiting at a position intersecting the lane boundary line between the subject lane and the adjacent lane and the target trajectory up to the entry position.

In step S13, the controller 101 determines whether a predetermined time has elapsed. When the predetermined time is determined to have elapsed, the process proceeds to step S14, and when the predetermined time is determined not to have elapsed, the process returns to step S10. The predetermined time is an experimentally determined time although not particularly limited. The controller 101 can appropriately change the predetermined time.

When the predetermined time is determined to have elapsed in step S13, the process proceeds to step S14. In step S14, the controller 101 sets the traveling position of the subject vehicle. For example, the controller 101 sets the traveling position of the subject vehicle at a predetermined position near the center of the subject lane. When the processing in step S14 is completed, the process returns to step S1, and the processing in step S1 and subsequent steps is executed again. This allows the vehicle controller 100 to execute lane change processing if no space is determined to be present in the entry position in step S10 and the subject vehicle cannot change the lane, the lane change processing can be executed again.

When the subject vehicle is determined not to enter the front of another vehicle for the lane change in step S5, or when no distractive factor for the driver of another vehicle is determined to be present in step S6, the process proceeds to step S8. In step S8, the controller 101 sets the lane change time to a predetermined time set in advance. The predetermined time in this step is the same as the predetermined time described in step S7. When the process of step S8 ends, the process proceeds to step S9. Since the following description is the same except that the lane change time is the time set in step S8, the above description will be referred to as appropriate.

As described above, in the subject vehicle control method according to the present embodiment, the controller 101 acquires surrounding information of the subject vehicle from the surrounding environment sensor group 10 and the communicator 32 mounted on the subject vehicle. The controller 101 determines whether a distractive factor for the driver of another vehicle is present in accordance with the surrounding information when the subject vehicle is going to enter the front of another vehicle traveling on the adjacent lane for the lane change. When having determined the distractive factor to be present, the controller 101 sets the lane change time required for the subject vehicle to change the lane longer than when determining none of the distractive factor to be present and controls the traveling position of the subject vehicle on the subject lane within the lane change time. This gives the driver of another vehicle a time for confirming the behavior of the subject vehicle when the subject vehicle is going to enter the front of another vehicle for the lane change. Thus, the chance for the driver of another vehicle to notice the subject vehicle before the subject vehicle completing the lane change increases.

In the present embodiment, the controller 101 sets at least one of the lighting time of the direction indicator 80 in the lane change time and the time required for the subject vehicle to move from the subject lane to the adjacent lane longer than when no factor distracts the driver of another vehicle. This increases, for example, the chance for the driver of another vehicle to notice the direction indicator of the subject vehicle and the presence of the subject vehicle when the controller 101 having setting the lighting time of the direction indicator 80 longer.

Further, for example, the chance for the driver of another vehicle to notice the subject vehicle intending to enter the front of another vehicle is increased when the controller 101 having setting the time for the subject vehicle to move longer.

In the present embodiment, distractive factors for the driver of another vehicle include at least one of a display of a traffic light, a site of a traffic accident, a direction indicator during lighting, a shape of a road, an emergency vehicle, a sound of a car navigation mounted on another vehicle, an emergency earthquake information, the behavior of the vehicle, and the shape or color of the vehicle. Thus, the controller 101 can determine that the distractive factor for the driver of another vehicle is present by detecting only one of these factors, which typically affects the driving operation.

In addition, in the present embodiment, the distractive factor for the driver of another vehicle includes a preceding vehicle of another vehicle in a lane adjacent to the adjacent lane on the opposite side of the subject lane. For example, the subject vehicle may get in sight of the driver of another vehicle not only the preceding vehicle when the subjective vehicle also precedes another vehicle. In such cases, the controller 101 can determine the preceding vehicle, which the driver typically tends to distract, as distractive factor for the driver.

Second Embodiment

A vehicle control device and a vehicle control method according to another embodiment of the present invention will be described. In the present embodiment, some of the functions of the control setting unit 106 are different from those of the first embodiment. Specifically, the method of setting the lane change time is different from that in the first embodiment. Other configurations and control processes are the same as those of the first embodiment, and thus the above description will be referred to.

The control setting unit 106 of the present embodiment calculates a probability that the driver of another vehicle gazes at the distractive factor (hereinafter, referred to as gaze probability). For a plurality of distractive factors, the control setting unit 106 calculates the gaze probability for each factor.

Figure 4:
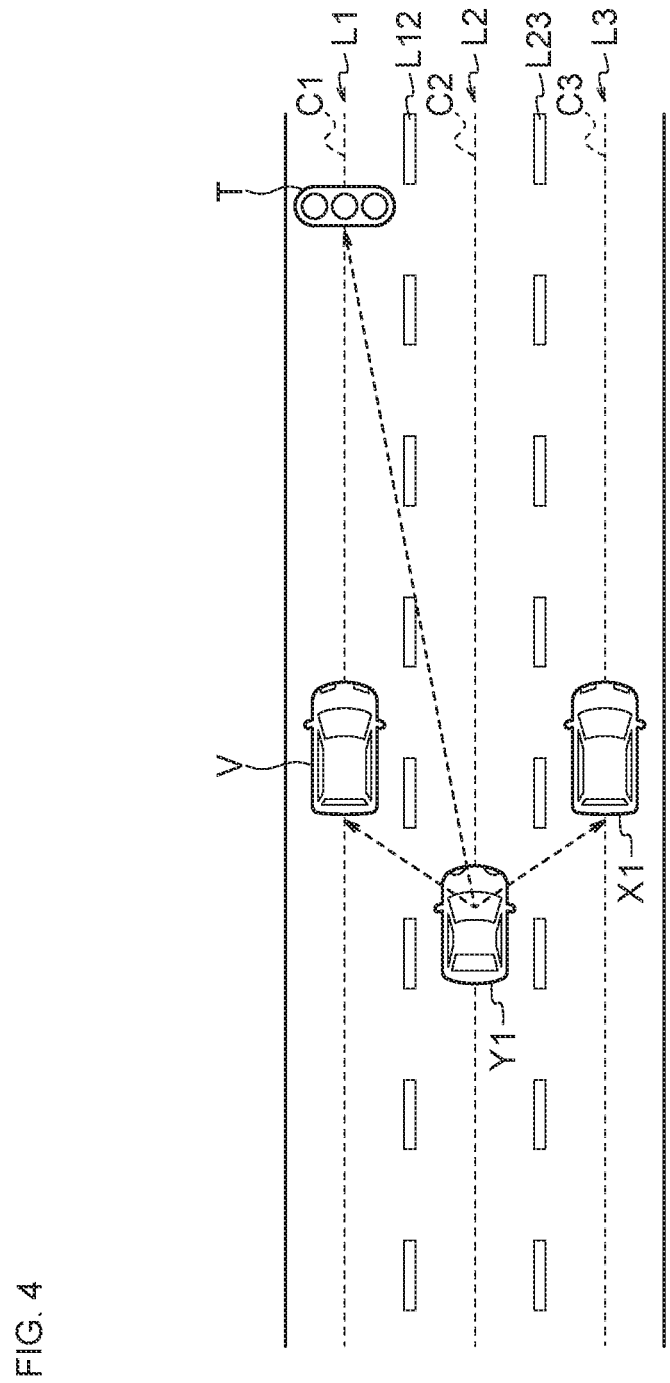
FIG. 4 is a diagram for explaining a lane change time calculated by the vehicle control device according to the second embodiment.

FIG. 4 is a diagram corresponding to FIG. 3, and is an example of a scene before the subject vehicle V moves from the lane $L_1$ to the lane $L_2$ on a road of one side 3 lanes (a lane $L_1$, a lane $L_2$, and a lane $L_3$) for the lane change. The scene of FIG. 4 differs from the scene of FIG. 3 in that a traffic light T is provided in front of the vehicle V in the lane $L_1$. In FIG. 4, a dashed arrow extending from another vehicle $Y_1$ indicates the direction of the driver's sight of another vehicle $Y_1$. In FIG. 4, it is assumed that the driver of another vehicle $Y_1$ is paying attention to all of the subject vehicle V, the other vehicle $X_1$, and the signal T. The type of signal display of the traffic light T is not particularly limited.

In the example of FIG. 4, the control setting unit 106 recognizes, in accordance with the surrounding information of the subject vehicle V, that another vehicle $X_1$ precedes another vehicle $Y_1$ and that the signal T is present. Then, the control setting unit 106 determines that a distractive factor for the driver of another vehicle $Y_1$ is present.

The control setting unit 106 calculates the gaze probability of the driver of another vehicle $Y_1$ for each distractive factor for the driver of another vehicle $Y_1$. For example, the control setting unit 106 acquires a value of the gaze probability corresponding to the type of the distractive factor from a storage such as a ROM. Such storage has the gaze probability set in advance in accordance with the type of the distractive factor. In the case of FIG. 4, the control setting unit 106 calculates the gaze probability of the driver of another vehicle $Y_1$ with respect to another vehicle $X_1$ by acquiring the gaze probability with the type corresponding to another vehicle $X_1$ and calculates the gaze probability of the driver of another $Y_1$ with respect to the signal T by acquiring the gaze probability with the type corresponding to the signal T.

Further, the control setting unit 106 also calculates the probability that the driver of another vehicle gazes at the subject vehicle when the subjective vehicle also distracts the driver. The subject vehicle distracting the driver of another vehicle includes the subject vehicle preceding another vehicle on the subject vehicle. In the case of the example of FIG. 4, the subject vehicle V preceding another vehicle $Y_1$ on the lane $L_1$ also corresponds to the distractive factor of another vehicle $Y_1$. The control setting unit 106 calculates the gaze probability of another vehicle $Y_1$ with respect to another vehicle $X_1$ by acquiring the gaze probability with the type corresponding to the subject vehicle V. In the example of FIG. 4, for example, the control setting unit 106 calculates the gaze probability for the subject vehicle V as 20%, the gaze probability for another vehicle $X_1$ as 20%, and the gaze probability for the signal T as 60%, so that the sum of the gaze probabilities equals to 100%.

Further, the control setting unit 106 of the present embodiment sets the additional time corresponding to the gaze probability when having calculated the gaze probability of the driver of another vehicle. For example, the control setting unit 106 sets the additional time in accordance with the gaze probability of factors other than the subject vehicle although not particularly limited. For example, the control setting unit 106, the higher the gaze probability with respect to the distractive factor, sets the additional time longer. In other words, the lower the gaze probability for the subject vehicle, the longer the lane change time is set. Thus, the lower the possibility for the driver of another vehicle to notice the subject vehicle is, the longer the lane change time is set. This allows to gives more chance to notice the subject vehicle to the driver of another vehicle.

For example, the control setting unit 106 sets the additional time by multiplying the ratio of the gaze probability for the distractive factor of the driver of another vehicle and the gaze probability for the subject vehicle by the predetermined unit time. The predetermined unit time is an experimentally determined time although not particularly limited. The control setting unit 106 can appropriately change the unit time. In the example of FIG. 4, for example, the control setting unit 106 sets the additional time as 4 seconds by multiplying the gaze probability (gaze probability for another vehicle $X_1$: 20%, gaze probability for the traffic light T: 60%) other than the subject vehicle V by 5 seconds (unit time). The values of the gaze probability, the unit time, and the additional time used in the above description are examples, and these values are not particularly limited.

Figure 5A:
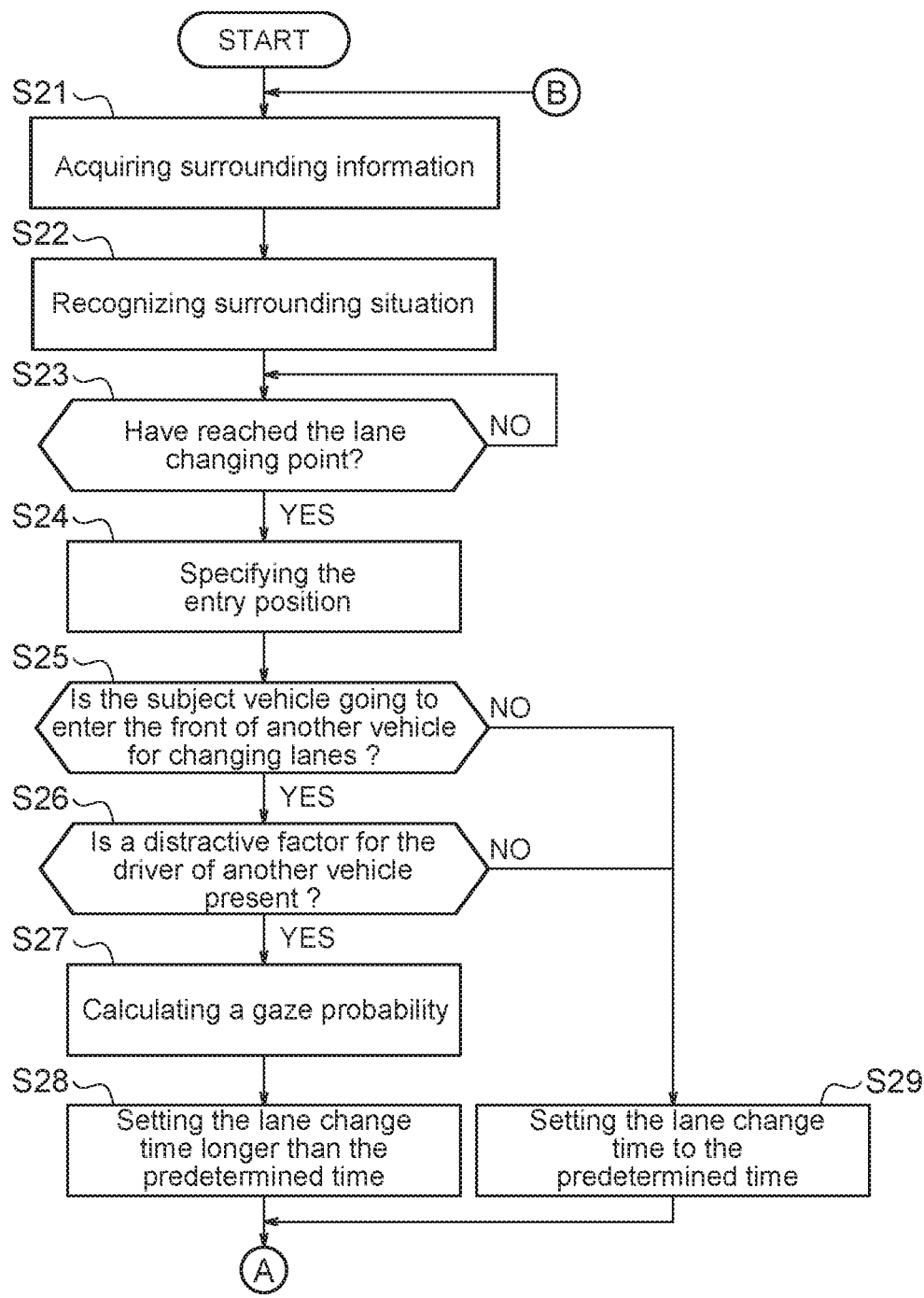
FIG. 5A is a flowchart of a control process executed by the vehicle control device according to the second embodiment of the present invention.
Figure 5B:
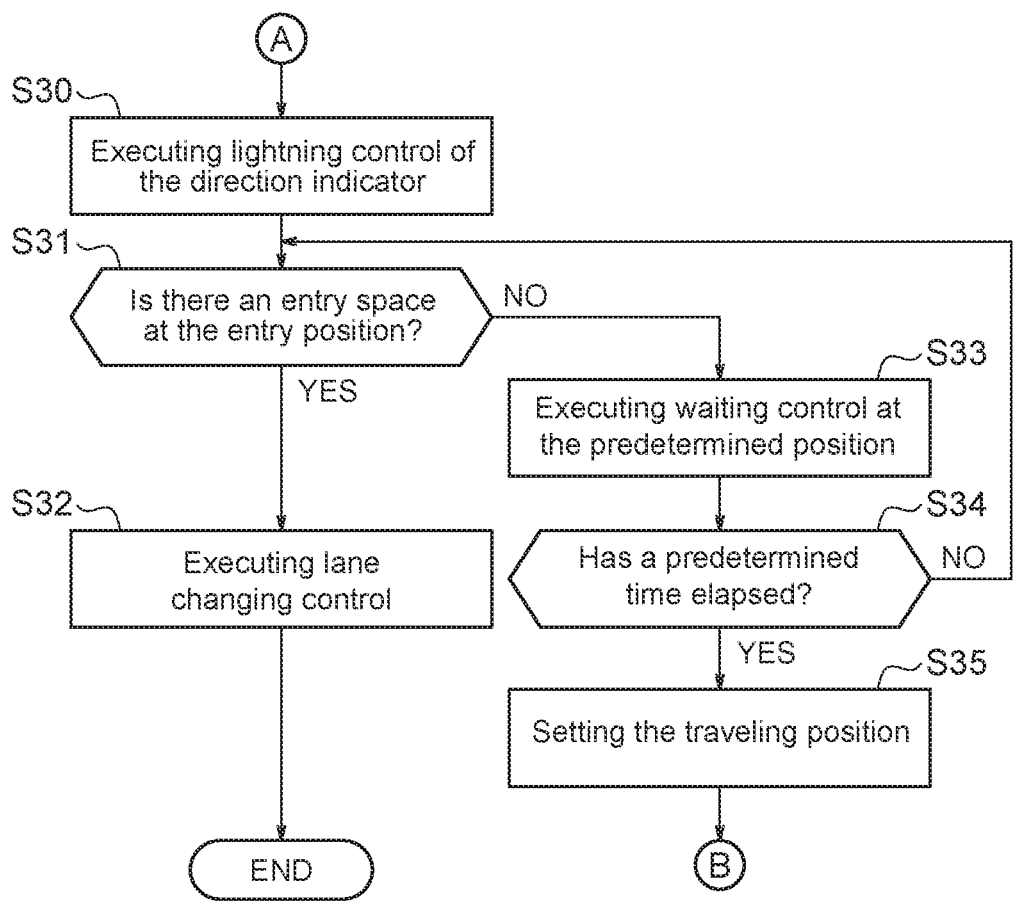
FIG. 5B is a flowchart of a control process executed by a vehicle control device according to a second embodiment.

Next, a control flow of the controller 101 according to the present embodiment will be described with reference to FIGS. 5A and 5B. FIG. 5A and FIG. 5B are flowcharts of a control process executed by the vehicle controller 100 according to the present embodiment. The description above is referred to for the same portions as those of the control flow according to the first embodiment.

Steps S21 to S26 correspond to steps S1 to S6 in the FIG. 2A. The description of these steps will be referred to above.

When a distractive factor for the driver of another vehicle is determined to be present in step S26, the process proceeds to step S27. In step S27, the controller 101 calculates the gaze probability of the driver of another vehicle gazing at the distractive factor. For example, the controller 101 acquires the gaze probability set in advance in accordance with the type of distractive factors from a storage such as a ROM.

In step S28, the controller 101 sets the additional time in accordance with the gaze probability calculated in step S27. This sets a lane change time corresponding to the gaze probability longer than when no factor distracts the driver of another vehicle. For example, the controller 101 sets the additional time by multiplying the gaze probability of the driver of another vehicle by a preset unit time. This step corresponds to step S7 in FIG. 2A.

Steps S30 to S35 correspond to steps S9 to S14 in FIG. 2B. Thus, the description of these steps will be referred to above.

As described above, in the vehicle control method according to the present embodiment, the vehicle controller 100 calculates the gaze probability of the driver of another vehicle to gaze at the distractive factor, the higher the gaze probability is, the longer sets the lane change time. Thus, the higher the possibility for the driver of another vehicle not to notice the subject vehicle is, the longer the lane change time is set. This allows to gives the driver of another vehicle more chance to notice the subject vehicle that is intended to enter the front of another vehicle for the lane change.

Third Embodiment

A vehicle control apparatus and a vehicle control method according to another embodiment of the present invention will be described. In the present embodiment, some of the functions of the control setting unit 106 are different from those in the above-described embodiment. Specifically, the method of setting the lane change time is different from that in the first embodiment and the second embodiment. The other configurations and control processing are the same as those of the first embodiment and the second embodiment, and therefore, the above description will be referred to.

The control setting unit 106 of the present embodiment calculates the influence degree of the distractive factor for the driver of another vehicle (hereinafter, simply referred to as the influence degree), which is the height of the influence on the driving operation of another vehicle. For a plurality of the factors, the control setting unit 106 calculates the influence degree for each factor.

FIG. 6 is a diagram corresponding to FIGS. 3 and 4, and is an example of a scene before the subject vehicle V moves from the lane $L_1$ to the lane $L_2$ on a road of one-sided three lanes (a lane $L_1$, a lane $L_2$, and a lane $L_3$) for the lane change. The scene of FIG. 6, unlike the scene of FIG. 4, is a scene where the signal display of the signal T is switched. Further, in the scene of FIG. 6, unlike the scene of FIG. 4, another vehicle $X_1$ turns on the direction indicator on the lane $L_2$.

In the example of FIG. 6, the control setting unit 106, in accordance with the surrounding information of the subject vehicle V, recognizes that another vehicle $X_1$ precedes another vehicle $Y_1$ and that the signal T is present. Then, the control setting unit 106 determines that distractive factors for the driver of another vehicle $Y_1$ are present.

The control setting unit 106 calculates the influence degree for each distractive factor for the driver of another vehicle $Y_1$. For example, the control setting unit 106 acquires a value of the influence degree corresponding to the type of the distractive factor and the state of the distractive factor from a storage such as a ROM. For example, such storage has the influence degree set in advance in accordance with the type of the distractive factor and the state of the distractive factor. For the example of FIG. 6, the control setting unit 106 calculates the influence degree of another vehicle $X_1$ as 2.0. The breakdown of influence degree of another vehicle $X_1$ is 1.0 on the type of vehicle, and 1.0 on the state of the direction indicator. Further, the control setting unit 106 calculates the influence degree of the signal T as 1.5. The breakdown of the influence degree of the signal T is 0.8 on the type of signal T, and 0.7 on the state of switching the signal display.

Further, the control setting unit 106 also calculates the influence degree of the subject vehicle when the subject vehicle also falls into a distractive factor for the driver of another vehicle. In the case of the example of FIG. 6, the control setting unit 106 calculates the influence degree of the subject vehicle V as 1.0. The breakdown of the influence degree of the vehicle V is 1.0 on the type of vehicle V.

Further, in the present embodiment, similarly to the second embodiment described above, the control setting unit 106 calculates the gaze probability of the driver of another vehicle for each distractive factor. Further, the control setting unit 106 also calculates the gaze probability that the driver of another vehicle gazes at the subject vehicle when the subject vehicle also falls under the distractive factor. For the explanation of the gaze probability, the above-mentioned explanation is referred to.

Then, the control setting unit 106 of the present embodiment sets the additional time in accordance with the gaze probability of the driver on another vehicle and influence degree of the distractive factors for the driver. Specifically, the control setting unit 106 multiplies the gaze probability of the driver of another vehicle by the influence degree of the distractive factor and sets the additional time according to the multiplication value. For example, the control setting unit 106 sets the additional time longer as the multiplication value the gaze probability of the driver and the influence degree of the distractive factor is higher. That is, the lane change time is set longer as the multiplication value is higher. For a plurality of distractive factors, the control setting unit 106 calculates the multiplication value for each factor. Then, the control setting unit 106 sums a plurality of multiplication values. The control setting unit 106 sets the additional time according to the sum value. For example, the control setting unit 106 sets the additional time longer as the multiplication values are higher. This sets the lane change time longer as the multiplication values are higher.

For example, the control setting unit 106 sets the additional time by multiplying the multiplication value of the gaze probability and the influence degree by the predetermined unit time. The predetermined unit time is an experimentally determined time although not particularly limited. The control setting unit 106 can appropriately change the unit time. In the example of FIG. 6, similarly to the example of FIG. 4, it is assumed that the gaze probability for the subject vehicle V is 20%, the gaze probability for another vehicle $X_1$ is 20%, and the gaze probability for the traffic light T is 60%. In this instance, the control setting unit 106 multiplies the gaze probability for other than the subject vehicle V by the influence degree (the influence degree of the vehicle $X_1$: 2.0, the influence degree of the traffic light T: 1.5). For example, a multiplication value of 20%×2.0=4.0 and a multiplication value of 60%×1.5=9.0 are calculated. Then, the control setting unit 106 sets the additional time as 2.6 seconds by multiplying the sum value (13.0) obtained by summing the plurality of multiplication values by 0.2 seconds (unit time). The respective values of the gaze probability, the influence degree, the unit time, and the additional time used in the above description are examples, and these values are not particularly limited.

Figure 7A:
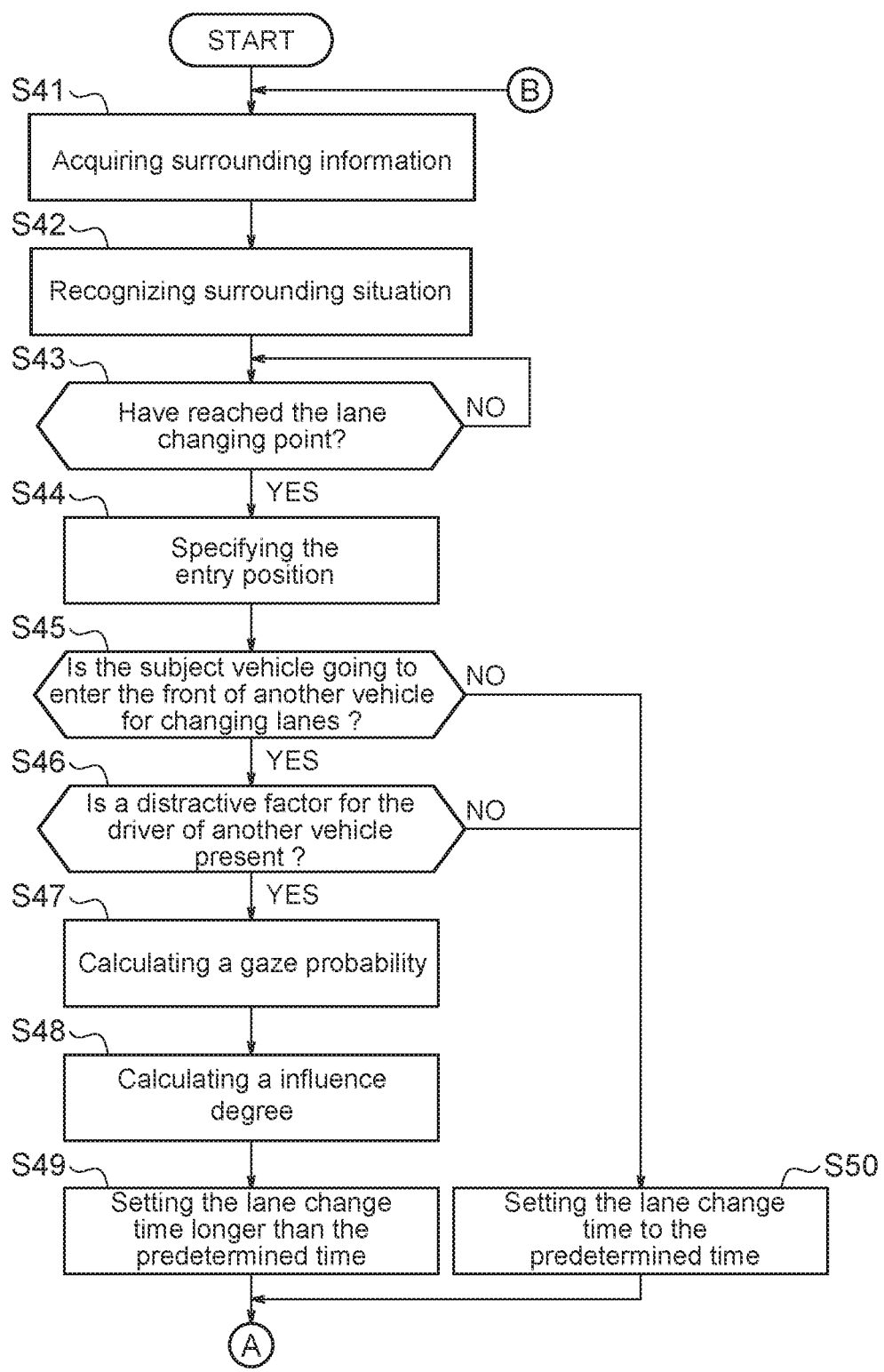
FIG. 7A is a flowchart of a control process executed by the vehicle control device according to the third embodiment of the present invention.
Figure 7B:
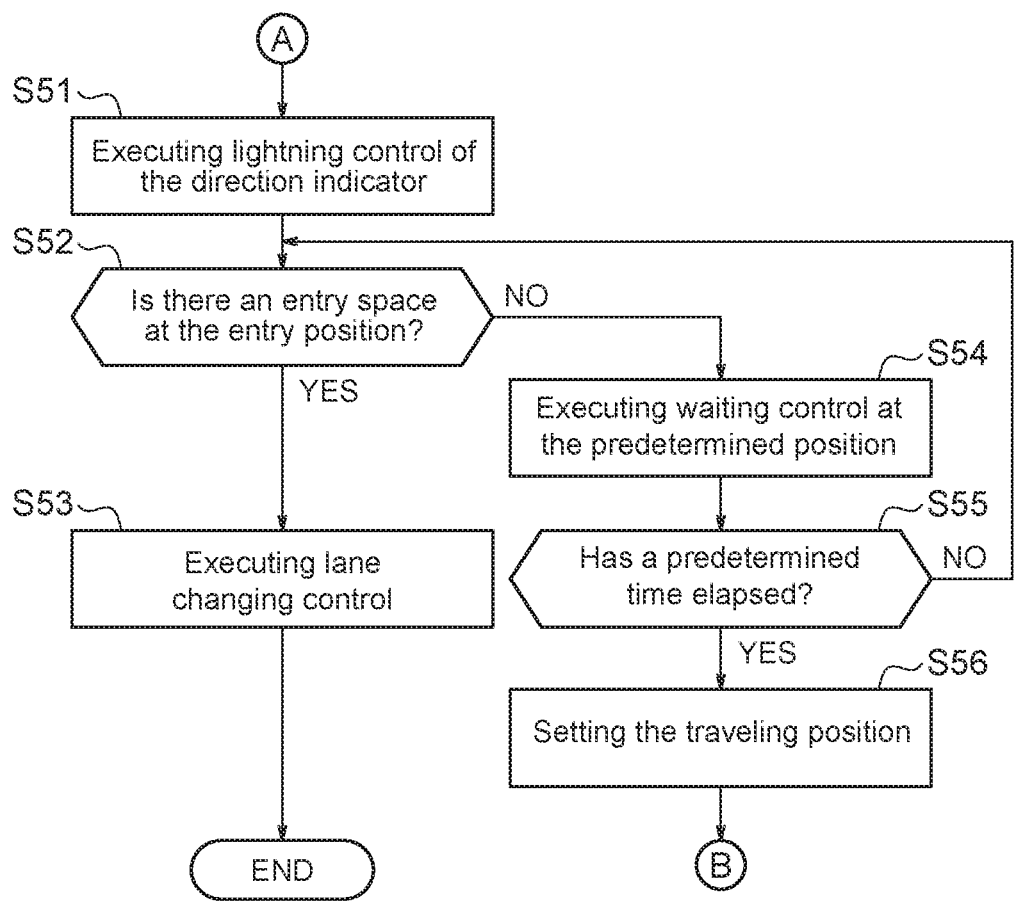
FIG. 7B is a flowchart of a control process executed by a vehicle control device according to a third embodiment.

Next, a control flow of the controller 101 according to the present embodiment will be described with reference to FIG. 7. FIG. 7 is a flowchart of a control process executed by the vehicle controller 100 according to the present embodiment. Note that the above description is referred to for the same portions as those of the control flows according to the first embodiment and the second embodiment.

Steps S41 to S46 correspond to steps S1 to S6 in FIG. 2A. Thus, the description of these steps will be referred to above. The step S47 corresponds to the step S27 in FIG. 5A. Thus, the description of these steps will be referred to above.

In step S48, the controller 101 calculates the influence degree on the driving operation of another vehicle by the distractive factor for the driver of another vehicle. The influence degree is determined by, for example, parameters of the type and state of the distractive factor. For example, the controller 101 acquires a value of the influence degree corresponding to the type of the distractive factor and the state of the distractive factor from a storage such as a ROM.

In step S49, the controller 101 sets the additional time on the basis of the gaze probability calculated in step S47 and the influence degree calculated in step S48. This sets the lane change time corresponding to the gaze probability and the influence degree longer than when no factor distracts the driver of another vehicle. For example, the controller 101 sets the additional time by multiplying the multiplication value of the gaze probability of the driver of another vehicle and the influence degree of the distractive factor by a predetermined unit time. This step corresponds to step S7 in FIG. 2A and step S28 in FIG. 5A.

Steps S51 to S56 correspond to steps S9 to S14 in the FIG. 2B and steps S30 to S35 in FIGS. 5A and 5B. Thus, the description of these steps will be referred to above.

As described above, in the vehicle control method according to the present embodiment, the vehicle controller 100 calculates the influence degree of distractive factors on the driving operation of the driver of another vehicle. Then, the higher the multiplication value obtained by multiplying the gaze probability and the influence degree of the driver of another vehicle, the longer the vehicle controller 100 sets the lane change time. This prevents the lane change time from being set longer due to factors that has small impact on driving but the driver is likely to gaze at, for example, as at accident sites in oncoming lanes. In other words, the vehicle controller 100 is allowed to set longer for factors that has a high impact on driving and the driver of another vehicle is likely to gaze at.

Further, in the present embodiment, for a plurality of distractive factors for the driver of another vehicle, the vehicle controller 100 calculates the gaze probability and the influence degree for each factor and calculate the multiplication value of the gaze probability and the influence degree for each factor. Then, the vehicle controller 100 calculates the total value of a plurality of multiplied values calculated for each factor, and as the total value is higher, sets the lane change time longer. This allows to set the lane change time longer and allows the driver of another vehicle to confirm the behavior of the subject vehicle at longer time when, for example, there are a plurality of distractive factors for the driver of another vehicle and the multiplication value of the gaze probability and the influence degree for each factor is relatively high. This allows to increase the possibility that the driver of another vehicle notices the subject vehicle in the scene where the subject vehicle enters the front of another vehicle for the lane change.

In the present embodiment has been described a method of setting the lane change time according to the multiplication value obtained by multiplying the gaze probability and the influence degree of the driver of another vehicle as an example, but is not limited. For example, the lane change time may be set only in accordance with the influence degree. For example, the vehicle controller 100, the higher the influence degree, sets a longer additional time. The vehicle controller 100 sets the additional time corresponding to the influence degree by multiplying the unit time to the degree of influence. This allows to set a longer lane change time as the factor having a higher influence degree and to increase the time for the driver of another vehicle to confirm the behavior of the subject vehicle. Therefore, it is allowed to increase the possibility that the driver of another vehicle notices the subject vehicle in the scene where the subject vehicle enters the front of another vehicle for the lane change.

In addition, for a plurality of distractive factors, the vehicle controller 100 may set the lane change time in another way. For example, the vehicle controller 100 may calculate the total value of a plurality of gaze probabilities calculated for each factor, and the higher the total value, the longer set the lane change time. Further, for example, the vehicle controller 100 may calculate a total value of a plurality of influence degrees calculated for each factor, and the higher the total value, the longer set the lane change time.

Fourth Embodiment

A vehicle control apparatus and a vehicle control method according to another embodiment of the present invention will be described. In the present embodiment, the vehicle controller 100 includes an estimation unit 110 (not shown) in contrast to the above-described embodiment. In the present embodiment, some functions of the control setting unit 106 and the travel control unit 108 are different from those of the above-described embodiment. Specifically, as compared with the first embodiment to the third embodiment, a point for estimating the effective viewing field of the driver of another vehicle and a point for setting a position for starting execution of the traveling control in accordance with the estimated effective viewing field are different. Other configurations and control processes are the same as those of the first to third embodiments, and therefore the above description is incorporated.

The function of estimation unit 110 will be described. The estimation unit 110 estimates the effective viewing field of the driver of another vehicle. Specifically, the estimation unit 110 estimates the effective viewing field of the driver of another vehicle in accordance with at least one of the vehicle speed of another vehicle, the congestion degree of the road, and the driving skill of the driver. The following sections describe each of the methods for estimating the effective viewing field. In the following description, "estimating the effective area of view of the driver" means estimating the effective viewing angle for the driver, or estimating the effective viewing area for the driver. Therefore, "effective viewing field is narrow (wide)" indicates that the effective viewing angle is narrow (wide) or the effective viewing area is narrow (wide).

Here, the effective viewing field will be described. The viewing field of human being is divided into a central viewing field located at the center of the viewing field and a surrounding viewing field surrounding the central viewing field. The central viewing field is a viewing field within a range of about 5 degrees in the horizontal and vertical directions. When a human being sees an object, the human eye generally recognizes the object within a central viewing field. On the other hand, the surrounding viewing field is composed of an effective viewing field around the center viewing field, a stable viewing field around the effective viewing field, an auxiliary viewing field around the stable viewing field, and the like. When recognizing an object within an effective viewing field, a human being is more likely to notice the object than when recognizing the object in the surrounding viewing field other than the effective viewing field.

The estimation method in accordance with the vehicle speed among the effective viewing field estimation methods will be described. Typically, the higher the vehicle speed, the narrower the effective viewing field of the driver tends. This is because the higher the vehicle speed, the more carefully the driver performs the driving operation and the more taxing the driving operation is. As the driving operation gets taxing, the effective viewing field of the driver becomes narrower.

The estimation unit 110 estimates a narrower effective viewing field of the driver of another vehicle as the vehicle speed of another vehicle is higher. For example, the estimation unit 110 recognizes the relative speed of another vehicle with respect to the subject vehicle in accordance with the detection result by the radar 11 or the inter-vehicle communication, and recognizes the current vehicle speed of another vehicle from the vehicle speed of the subject vehicle. The estimation unit 110 acquires a map indicating the relationship between the vehicle speed and the effective viewing angle from a storage such as a ROM and calculates the value of the effective viewing angle corresponding to the current vehicle speed of another vehicle by referring to the map. This allows the estimation unit 110 to estimate the effective viewing field of the driver of another vehicle according to the vehicle speed of another vehicle. The relationship between the vehicle speed and the effective viewing angle may include a proportional relationship in which the higher the vehicle speed, the narrower the effective viewing angle.

Next, the estimation method of estimating the effective viewing angle in accordance with the congestion degree of the road will be described. The road may include the subject lane and an adjacent lane. Typically, the higher the congestion degree of the road, the narrower the effective viewing field of the driver tends. This is because as the distance between cars decreases, the more carefully the driver performs the driving operation and the more taxing the driving operation gets. As the driving operation gets taxing, the effective viewing field of the driver becomes narrower.

The estimation unit 110 estimates a narrower effective viewing field of the driver of another vehicle as the congestion degree of the road is higher. For example, the estimation unit 110 recognizes the number of another vehicles that the subject vehicle passes per unit time in accordance with the detection result by the radar 11 or the image captured by the imaging device 12 by. The estimation unit 110 acquires a map indicating the relationship between the number of another vehicles and the effective viewing angle from a storage such as a ROM, and calculates the value of the effective viewing angle corresponding to the number of other vehicles by referring to the map. Since the congestion degree of the road is higher as the number of other vehicles increases, the effective viewing field of the driver of other vehicles according to the congestion degree of the road can be estimated by calculating the effective viewing angle corresponding to the number of other vehicles. The relationship between the congestion degree of the road and the effective viewing angle is not limited to a proportional relationship in which the effective viewing angle becomes narrower as the congestion degree of the road becomes high.

Incidentally, the information used to estimate the congestion degree of the road is not limited to the information of the number of other vehicles that the subject vehicle passes per unit time described above. For example, congestion information, information of the average vehicle speed of the other vehicles or the subject vehicle in a predetermined section may be used. For example, the estimation unit 110 acquires information on the distance of the traffic congestion from VICS, and calculates the value of the effective viewing angle corresponding to the distance of the traffic congestion. Since the congestion degree of the road is higher as the distance of the congestion is longer, the effective viewing field of the driver of the other vehicles according to the congestion degree of the road can be estimated by calculating the effective viewing field angle corresponding to the distance of the congestion. Further, for example, the estimation unit 110 may acquire the information of the average vehicle speed of other vehicles section from VICS and calculate the value of the effective viewing angle corresponding to the average vehicle speed of other vehicles. Further, for example, the estimation unit 110 may acquire the information of the average vehicle speed of the subject vehicle in a predetermined section from the vehicle speed sensor 21 and calculate the value of the effective viewing angle corresponding to the average vehicle speed of the subject vehicle. Further, for example, the estimation unit 110 may acquire the information of the inter-vehicle distance between the subject vehicle and the preceding vehicle and the inter-vehicle distance between the subject vehicle and the rear vehicle from the radar 11, and may calculate the effective viewing angle corresponding to the inter-vehicle distances. Since the congestion degree of the road is higher as the average vehicle speed of the vehicle in general or the vehicle is slower, the effective visual field of the driver of the other vehicle according to the congestion degree of the road can be estimated by calculating the effective viewing angle corresponding to the average vehicle speed. Further, since the congestion degree of the road is higher as the distance between vehicles is shorter, calculating the effective viewing angle corresponding to the distance between vehicles allows to estimate the effective view of the driver of the other vehicle according to the congestion degree of the road.

A method of estimating the effective viewing angle in accordance with the driving skill of the driver will be described. Generally, the lower the driving skill, the narrower the effective viewing field of the driver tends. This is because the lower the driving skill, the more carefully the driver performs the driving operation and the more taxing the driving operation becomes. As the driving operation becomes taxing, the effective viewing field of the driver becomes narrower.

The estimation unit 110 estimates narrower effective viewing field of the driver of another vehicle as the driver's driving skill of another vehicle is lower. For example, the estimation unit 110 acquires the information of the steering angle of the steering mounted on another vehicle by the inter-vehicle communication and recognizes the range of the steering angle in the unit time. This allows to recognize how much the driver of another vehicle is operating the steering in the travel of the straight road when, for example, another vehicle is traveling on a straight road. The estimation unit 110 acquires a map indicating the relationship between the range of the steering angle per unit time and the effective viewing angle from a storage such as a ROM, for example, and calculates the value of the effective viewing angle corresponding to the range of the steering angle per unit time by referring to the map. Calculating the effective viewing angle corresponding to the range of steering angle per unit time allows to estimate the effective viewing field of the driver of another vehicle according to the congestion degree of the road in accordance with the knowledge that the driver's driving skill is lower as the range of steering angle per unit time is wider. As the relationship between the range of the steering angle per unit time and the effective viewing angle is not limited to a proportional relationship in which the wider the range of the steering angle, the narrower the effective viewing angle.

The control setting unit 106 of the present embodiment, in accordance with the effective viewing field of the driver of another vehicle, sets a start position for starting the execution of the traveling control of the subject vehicle. The traveling control of the subject vehicle is the lighting control and the lane change control of the direction indicator executed by the travel control unit 108. Specifically, in the present embodiment, the control setting unit 106 sets the start position so that the distance between another vehicle and the start position gets longer as the effective viewing field of the driver of another vehicle is narrower. In the present embodiment, the control setting unit 106 sets the front position with respect to another vehicle in the subject lane as the start position. That is, the control setting unit 106 sets the start position so that the preceding distance of the subject vehicle with respect to another vehicle gets longer as the effective viewing field of the driver of another vehicle is narrower.

For example, the control setting unit 106 acquires a map indicating the relationship between the effective viewing field and the distance from another vehicle to the start position from a storage such as a ROM, and calculates the distance corresponding to the effective viewing field of the driver of another vehicle by referring to the map. Then, the control setting unit 106 sets the start position so that the front end of the subject vehicle precedes the front end of another vehicle by the calculated distance. The relationship between the distance between the effective viewing field and the start position may be the proportional relationship that the distance from another vehicle as the effective viewing field is narrower to the start position is increased, but is not limited.

FIG. 8 is a diagram for explaining the relationship between the effective viewing field and the start position. FIGS. 8A and 8B are scenes in which the subject vehicle V changes from the lane $L_1$ to the lane $L_2$ on the road of one side 3 lanes (lane $L_1$, lane $L_2$, and lane $L_3$). The vehicles traveling on the lane $L_2$ are another vehicle $X_2$ preceding another vehicle $Y_1$ and another vehicle $Y_1$. The vehicles traveling on the lane $L_3$ are another vehicle $X_3$ preceding another vehicle $X_1$ and another vehicle $X_1$. Other points are the same as those in FIGS. 3, 4, and 6, and thus the above description is incorporated herein by reference. Note that the effective viewing field of the driver of another vehicle $Y_1$, the effective viewing field shown in FIG. 8A is assumed to be wider than the effective viewing field in FIG. 8B. Specifically, the effective viewing angle alpha$_1$ is wider than the effective viewing angle alpha 2. The effective viewing field $R_1$ is wider than the effective viewing field $R_2$. In FIGS. 8A and 8B, the effective viewing field is represented by a triangular shape, but this is an example of a method of representing the effective viewing field, and the form of the effective viewing field is not limited to the triangular shape in plan view.

In the example of FIG. 8A, the control setting unit 106 sets the start position so that the front end of the subject vehicle V precedes by the distance $D_1$ from the front end of another vehicle $Y_1$. The distance $D_1$ is a distance between another vehicle $Y_1$ and the subject vehicle V calculated in accordance with the effective viewing field of the driver of another vehicle $Y_1$ in FIG. 8A. Further, in the example of FIG. 8B, the control setting unit 106 sets the start position so that the front end of the subject vehicle V precedes by the distance D 2 from the front end of another vehicle $Y_1$. The distance D 2 is a distance between another vehicle $Y_1$ and the subject vehicle V calculated in accordance with the driver's effective viewing field of another vehicle $Y_1$ in FIG. 8B. Referring to FIG. 8A and FIG. 8B, the start position is set to precede another vehicle $Y_1$ as the effective viewing field of the driver of another vehicle $Y_1$ is narrower.

The travel control unit 108 of the present embodiment starts the travel control of the subject vehicle when the subject vehicle reaches the start position set by the control setting unit 106. Specifically, the travel control unit 108 executes the lighting control of the direction indicator at the timing when the subject vehicle has reached the start position.

Figure 9A:
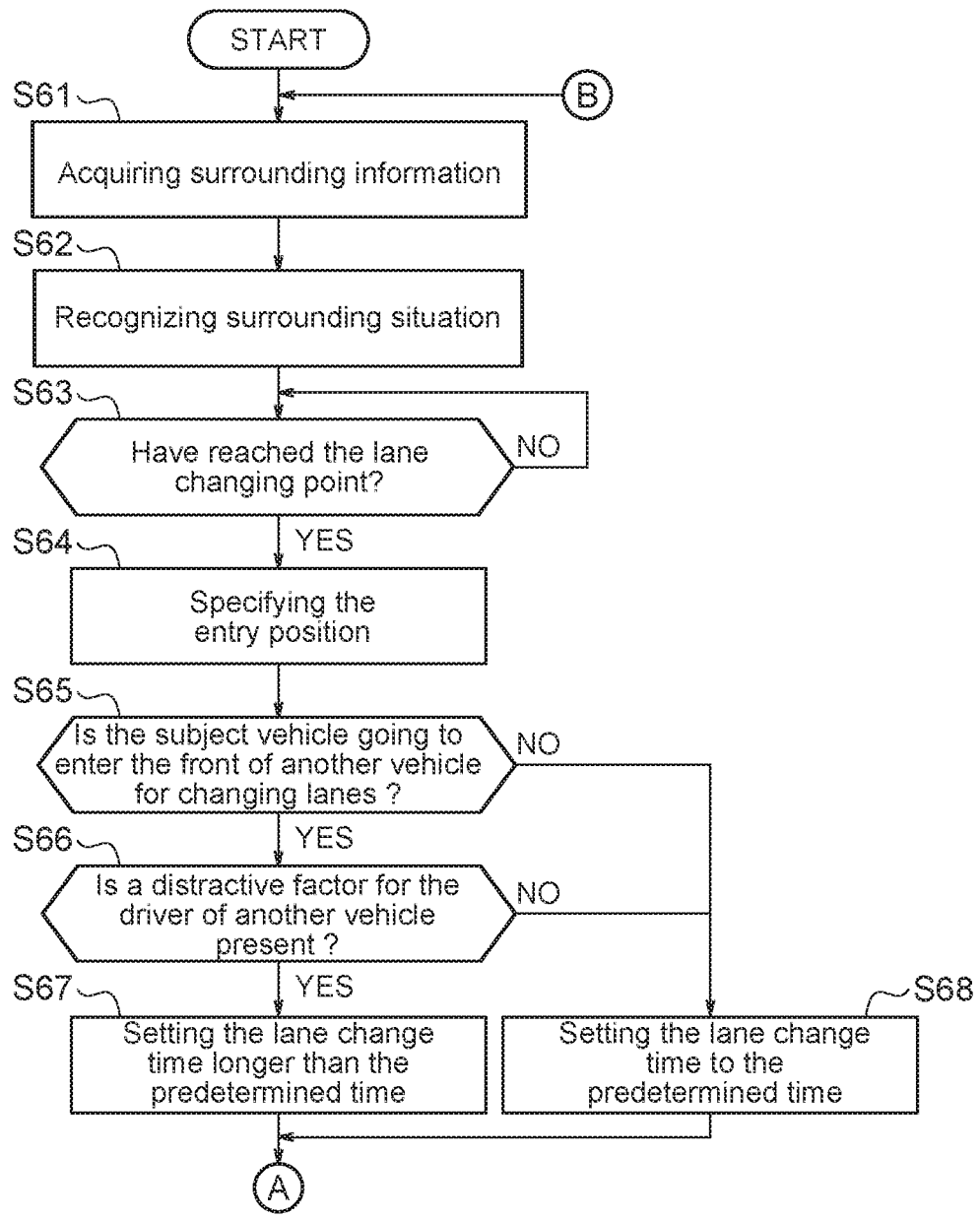
FIG. 9A is a flowchart of a control process executed by the vehicle control device according to the fourth embodiment of the present invention.
Figure 9B:
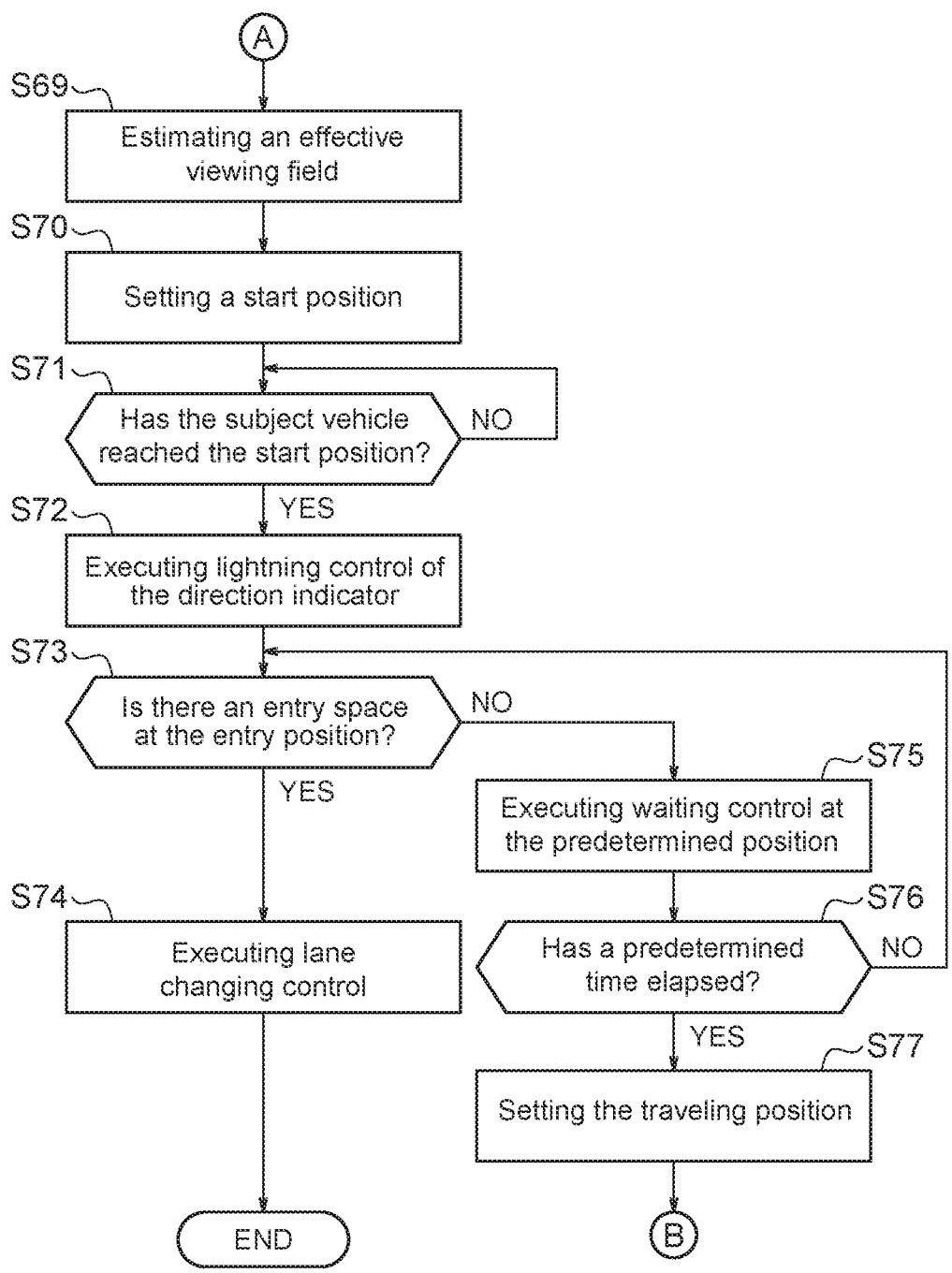
FIG. 9B is a flowchart of a control process executed by the vehicle control device according to the fourth embodiment of the present invention.

Next, a control flow of the controller 101 according to the present embodiment will be described with reference to FIGS. 9A and 9B. FIG. 9A and FIG. 9B are flowcharts of a control process executed by the vehicle controller 100 according to the present embodiment. The description above is referred to for the same portions as the vehicle control processing according to the first embodiment to the third embodiment.

Steps S61 to S68 correspond to steps S1 to S8 in the FIG. 2A. Thus, the description of these steps will be referred to above.

In step S69, the controller 101 estimates the effective viewing field of the driver of another vehicle in accordance with at least one of the vehicle speed of another vehicle, the congestion degree of the road, and the driver's skill of another vehicle. For example, the controller 101 recognizes the vehicle speed of another vehicle in accordance with the detection result by the radar 11. The controller 101 estimates the effective viewing field of the driver of another vehicle according to the vehicle speed of another vehicle by referring to the pre-stored map. The controller 101 estimates a narrower effective viewing field of the driver of another vehicle as the vehicle speed of another vehicle is higher.

In step S70, the controller 101, in accordance with the effective viewing field of the driver of another vehicle estimated in step S69, sets the start position to start the execution of the travel control. For example, the controller 101 calculates the distance from another vehicle to the subject vehicle according to the effective viewing field of the driver of another vehicle by referring to the pre-stored map. The controller 101, for example, sets the start position so that the front end of the vehicle precedes the front end of another vehicle by the calculated distance. The controller 101 sets a start position in the subject lane.

In step S71, the controller 101 determines whether the subject vehicle has reached the start position set in step S70. When the subject vehicle is determined to have reached the start position, the process proceeds to step S72. On the other hand, when the subject vehicle is determined not to have reached the start position, the process waits in step S71. The controller 101 controls the traveling of the subject vehicle so as to reach the start position of the subject vehicle after the processing of step S70 is completed although omitted in the flowchart of FIG. 8. Specifically, when the subject vehicle is traveling ahead of the start position, the controller 101 controls the vehicle speed of the subject vehicle lower relative to the vehicle speed of another vehicle. This allows the subject vehicle to retract relative to another vehicle and to reach the start position from the position ahead than the start position. On the other hand, when the subject vehicle is traveling behind the start position, the controller 101 controls the vehicle speed of the subject vehicle higher relative to the vehicle speed of another vehicle. This allows the subject vehicle to forward relative to another vehicle and to reach the start position from the position behind the start position.

When the subject vehicle is determined to have reached the start position in step S71, the process proceeds to step S72. Steps S72 to S76 correspond to steps S9 to S14 in the FIG. 2A. Thus, the description of these steps will be referred to above.

As described above, in the vehicle control method according to the present embodiment, the vehicle controller 100 estimates the effective viewing field of the driver of another vehicle in accordance with at least one of the vehicle speed of another vehicle, the congestion degree of the road, and the driver's skill of another vehicle. The vehicle controller 100 sets the start position for starting execution of the traveling control of the subject vehicle so that the narrower the estimated effective viewing field is, the longer the distance that the subject vehicle precedes another vehicle is. Then, when the subject vehicle has reached the start position, the vehicle controller 100 starts the lighting control of the direction indicator. This allows to increase the possibility that the direction indicator of the vehicle is turned on within the effective viewing field of the driver of another vehicle. This allows to increase the possibility that drivers of another vehicle will be aware that their subject vehicle is going to change lanes.

It should be appreciated that the embodiments explained heretofore are described to facilitate understanding of the present invention and are not described to limit the present invention. It is therefore intended that the factors disclosed in the above embodiments include all design changes and equivalents to fall within the technical scope of the present invention.

For example, the travel control unit 108 may execute other controls for the lane change in addition to the lighting control of the direction indicator and the lane change control. For example, the travel control unit 108 may control the subject vehicle to move to the adjacent lane side with respect to the center line of the subject lane along the traveling direction of the subject vehicle. For example, the travel control unit 108 may execute each control in the order of moving to side control, the lighting control of the direction indicator, and the lane change control for changing the lane of the subject vehicle. In this case, the lane change time includes the lighting time of the direction indicator 80 provided on the side of the adjacent lane, the time required to move the subject vehicle from the subject vehicle lane toward the entry position, the time required to move the subject vehicle to the adjacent lane side, and the time to travel while keeping the subject vehicle at the adjacent lane side.

Further, for example, the control setting unit 106 may set lightning time (the first time) of the direction indicator 80 provided on the adjacent lane side when no entry space is determined to be present at the entry position. For example, the control setting unit 106 may set the lighting time of the direction indicator 80 longer when the presence determining unit 107 determines that no entry space is present at the entry position in advance. The lane change time is set longer than when no factors distract the driver of another vehicle. This allows to increase the possibility that drivers of another vehicle will be aware that the subject vehicle is going to change lanes. Thus, for example, the possibility that the driver of another vehicle makes the entry space in the entry position can be increased.

For example, when determining that a factor distracts the driver of another vehicle, the control setting unit 106 may set longer at least one of the lighting time of the direction indicator 80 (the first time), the time required to move the subject vehicle from the subject lane toward the entry position specified on the adjacent lane (the fourth time), the time required to move the subject vehicle toward the adjacent lane side (the second time), and the time for the subject vehicle to travel while keeping at the adjacent lane side (the third time). This allows to set the lane change time longer than when no factor distracts the driver of another vehicle when distractive factors for the driver of another vehicle are present.

Further, the additional time may be set in accordance with the speed difference between the preceding vehicle and the subject vehicle when the preceding vehicle is traveling in a lane adjacent to the adjacent lane and at opposite side of the subject lane in a road having three or more lanes. For example, when the speed difference between the vehicle speed of the subject vehicle and the vehicle speed of the preceding vehicle is within a predetermined range, the control setting unit 106 may set a longer additional time as compared with the case where the speed difference is outside the predetermined range. When the speed difference is within a predetermined range, the relative positional relationship between the subject vehicle and the preceding vehicle does not change drastically according to elapsed time. Additionally, the driver is likely to distract attention from the subject vehicle than the speed difference is outside the predetermined range. Thus, drivers of another vehicle may pay equal attention to the subject vehicle and the preceding vehicle. When the speed difference is within the predetermined range, setting the lane change time longer than the speed difference is outside the predetermined range increases the chance for the driver of another vehicle to notice the subject vehicle.

Furthermore, the state of another vehicle may distracts the driver of another vehicle in addition to factors outside another vehicle. For example, the distractive factors for the driver of another vehicle may include the vehicle speed of another vehicle since the faster the speed is, the more carefully the driver operates and the driver is likely to distract. For example, when the vehicle speed of another vehicle is higher than a predetermined threshold value, the determining unit 105 may determine that a factor distract the driver of another vehicle. In this case, the lane change time is set longer than when no factor distracts the driver of another vehicle. The predetermined threshold value is an experimentally determined value.

The lighting of the direction indicator provided on the side opposite to the subject lane may distract the driver of another vehicle. This is in accordance with that the driver of another vehicle, for changing lanes of another vehicle, is likely to pay attention to the lane change compared with the subject vehicle. For example, the determining unit 105 may determine that a factor distracts the driver of another vehicle when the direction indicator of another vehicle provided on the side opposite to the subject lane is turned on. In this case, the lane change time is set longer than when no factor distracts the driver of another vehicle.

In addition, the method of estimating the effective viewing field may include another way in addition to the ways described in the fourth embodiment. For example, the estimation unit 110 may estimate the effective viewing field of the driver of another vehicle in accordance with at least one of the road form, the weather information, and the time information.

For example, the estimation unit 110 may estimate the effective viewing field of the driver of another vehicle narrower than in the case of the two lanes on one side including the subject lane and the adjacent lane when the road includes the three lanes on one side with the adjacent lane arranged at the center. This is because, the driver of another vehicle more carefully operates on the road with 3 lanes compared with traveling on the road with 2 lanes, then, the more taxing the driving operation becomes. The more taxing the driving operation becomes, the narrower the effective viewing field of the driver becomes. In addition to the three lanes on one side, for example, a form of the road may be a curve or a tunnel. For example, the estimation unit 110, when the vehicle is traveling on a curve or tunnel, as compared with the case where the vehicle is traveling on other roads, the effective viewing field of the driver of another vehicle may be estimated narrower.

Further, the estimation unit 110, may estimate the effective viewing field of the driver of another vehicle narrow when the weather is rainy, as compared with the case where the weather is fine. This is because, when the weather is rainy, the driver of another vehicle performs the driving operation more carefully than when the weather is fine, the driving operation becomes more taxing. As the driving operation becomes taxing, the effective viewing field of the driver becomes narrower.

Further, for example, when the time zone corresponds to night, the estimation unit 110 may estimate the effective viewing field of the driver of another vehicle to be narrower than when the time zone corresponds to other than night (morning, noon, and evening). This is because, the driver of another vehicle performs the driving operation more carefully at night as compared with in the daytime, and thus the driving operation becomes more taxing. As the driving operation becomes taxing, the effective viewing field of the driver becomes narrower.

Furthermore, the effective viewing field of the driver of another vehicle may be reflected in the gaze probability of the driver of another vehicle.

For example, if the control setting unit 106 determines that a factor not inside the effective viewing field of the driver distracts the driver, the factor may be excluded from distractive factors for the driver. For example, the control setting unit may calculated the gaze probability of the driver of another vehicle to the factor not inside the effective viewing field by reducing a predetermined value from the predetermined value of the gaze probability. Thus, reflecting the effective viewing field of the driver of another vehicle to the driver's gaze probability of another vehicle allows to increase the calculation accuracy of the gaze probability. This allows to increase the possibility that drivers of another vehicle will notice the presence of their subject vehicles.

For example, in this specification, the vehicle control apparatus according to the present invention will be described by taking the vehicle controller 100 as an example, but the present invention is not limited thereto. In addition, in this specification, the first lane according to the present invention will be described as an example of the subject lane, but the present invention is not limited thereto. In addition, in this specification, a second lane according to the present invention will be described as an example of an adjacent lane, but the present invention is not limited thereto. In addition, in this specification, the acquiring unit according to the present invention will be described using the information acquiring unit 102 as an example, but the present invention is not limited thereto. In addition, in this specification, the determining unit according to the present invention will be described using the determining unit 105 as an example, but the present invention is not limited thereto. In this specification, the setting unit according to the present invention will be described by taking the control setting unit 106 as an example, but the present invention is not limited to this. In this specification, the travel control unit according to the present invention will be described by taking the travel control unit 108 as an example, but the present invention is not limited to this.

EXPLANATIONS OF LETTERS OR NUMERALS

10 . . . Surrounding environment sensor group
11 . . . Radar
12 . . . Imaging device
20 . . . Vehicle sensor group
21 . . . The vehicle speed sensor
22 . . . Accelerometer
23 . . . Gyro sensor
24 . . . The steering angle sensor
25 . . . Accelerator sensor
26 . . . Brake sensor
30 . . . Navigation system
31 . . . GPS
32 . . . Communicator
33 . . . Navi controller
40 . . . Map database
50 . . . HMI
60 . . . Actuator controller
70 . . . Vehicle actuator group
71 . . . Steering actuator
72 . . . Accelerator actuator
73 . . . Brake control actuator
80 . . . Direction indicator
100 . . . Vehicle controller
101 . . . Control unit
102 . . . Acquiring unit
103 . . . Situation recognizing unit
104 . . . Specifying unit
105 . . . Determining unit
106 . . . Control setting unit
107 . . . Space presence determining unit
108 . . . The travel control unit
109 . . . Storage
200 . . . Vehicle system

The invention claimed is:

1. A vehicle control method executed by a processor capable of executing a lane change of a subject vehicle, comprising:
    acquiring surrounding information of the subject vehicle by a sensor provided in the subject vehicle;
    determining whether a distractive factor for a driver of another vehicle is present when the subject vehicle enters in front of the other vehicle traveling on a second lane that is adjacent to a first lane for changing lanes from the first lane to the second lane;
    setting a lane change time required for the subject vehicle to change lanes, the lane change time being longer when determining the distractive factor to be present than when determining the distractive factor not to be present;
    controlling a traveling position of the subject vehicle on the first lane within the lane change time.

2. The vehicle control method according to claim 1, further comprising:
    setting at least one of a first time, a second time, a third time and a fourth time included in the lane change time longer than when determining the distractive factor not to be present, wherein
    the first time is a time for a direction indicator of the subject vehicle to light up,
    the second time is a time required for moving the subject vehicle to a side of the second lane with respect to a center line of the first lane along with a traveling direction of the subject vehicle,
    the third time is a time for the subject vehicle to travel while keeping at the side of the second lane with respect to the center line, and
    the fourth time is a time required for moving the subject vehicle to the second lane from the first lane.

3. The vehicle control method according to claim 1, further comprising:
    calculating a gaze probability of the driver to gaze at the distractive factor; and
    setting the lane change time longer as the gaze probability of the driver is higher.

4. The vehicle control method according to claim 1, further comprising:
    calculating an influence degree of the distractive factor on an operation of the other vehicle; and
    setting the lane change time longer as the influence degree of the distractive factor is higher.

5. The vehicle control method according to claim 1, further comprising:
    calculating a gaze probability of the driver to gaze at the distractive factor;
    calculating an influence degree of the distractive factor on an operation of the other vehicle; and
    setting the lane change time longer as a multiplication value obtained by multiplying the gaze probability of the driver by the influence degree of the distractive factor is higher.

6. The vehicle control method according to claim 5, further comprising:
    calculating, when determining a plurality of distractive factors to be present, for each of the plurality of the distractive factors, the gaze probability of the driver, the influence degree of the distractive factor, and the multiplication value;
    setting the lane change time longer as any one of a sum of each gaze probability of the driver, a sum of each influence degree of the distractive factor, or the plurality of the multiplication value is higher.

7. The vehicle control method according to claim 1, wherein
    the distractive factor includes at least one of a signal display of a traffic light, a site of a traffic accident, a direction indicator during lighting, a form of a road including the first lane and the second lane, an emergency vehicle, a sound of car navigation mounted on the other vehicle, an emergency earthquake warning, a behavior of the vehicle, and a shape or color of the vehicle.

8. The vehicle control method according to claim 1, wherein
the distractive factor is a preceding vehicle preceding the other vehicle in a third lane, and
the third lane is a lane adjacent to the second lane that is located on an opposite side of the first lane.

9. The vehicle control method according to claim 8, further comprising:
acquiring information on a preceding vehicle speed of the preceding vehicle from the sensor detecting a state of a surrounding of the subject vehicle;
comparing a subject vehicle speed of the subject vehicle with the preceding vehicle speed of the preceding vehicle; and
when a speed difference between the subject vehicle speed of the subject vehicle and the preceding vehicle speed of the preceding vehicle is within a predetermined range, setting the lane change time longer than when the speed difference is outside the predetermined range.

10. The vehicle control method according to claim 1, further comprising:
estimating an effective field of vision of the driver based on at least one of a vehicle speed of the other vehicle, a congestion degree of a road including the first lane and the second lane, a form of the road, weather information, time information, and a driving skill of the driver;
setting a start position for starting execution of controlling a driving position so that a distance preceding the subject vehicle with respect to the other vehicle becomes longer as the effective field of vision becomes narrower; and
starting execution of controlling the traveling position when the subject vehicle reaches the start position.

11. A vehicle control device, comprising:
a device acquiring information about surrounding of a subject vehicle; and
a controller configured to change a lane of the subject vehicle, the controller comprising:
an acquiring unit to acquire surrounding information of the subject vehicle from the device;
a determining unit determining whether a distractive factor for a driver of another vehicle is present when the subject vehicle changes lanes from a first lane to a second lane adjacent to the first lane to enter in front of the other vehicle traveling on the second lane in accordance with the surrounding information of the subject vehicle;
a setting unit setting a lane change time required for the subject vehicle to change lanes, the lane change time being longer when the determining unit determines the distractive factor to be present than determines the distractive factor not to be present; and
a travel control unit controlling a traveling position of the subject vehicle on the first lane within the lane change time.

\* \* \* \* \*